US012566530B2

(12) United States Patent
Cho et al.

(10) Patent No.: US 12,566,530 B2
(45) Date of Patent: Mar. 3, 2026

(54) ELECTRONIC DEVICE AND METHOD FOR EDITING CONTENT THEREOF

(71) Applicant: Samsung Electronics Co., Ltd., Suwon-si (KR)

(72) Inventors: Bongje Cho, Suwon-si (KR); Taewon Kwak, Suwon-si (KR); Yongmin Koo, Suwon-si (KR); Jinsu Shin, Suwon-si (KR); Jiwon Lee, Suwon-si (KR); Eunji Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 847 days.

(21) Appl. No.: 17/861,904

(22) Filed: Jul. 11, 2022

(65) Prior Publication Data

US 2023/0051195 A1 Feb. 16, 2023

Related U.S. Application Data

(63) Continuation of application No. PCT/KR2022/008460, filed on Jun. 15, 2022.

(30) Foreign Application Priority Data

Aug. 10, 2021 (KR) ........................ 10-2021-0105569

(51) Int. Cl.
*G06F 3/0481* (2022.01)
*G06F 3/0483* (2013.01)
(Continued)

(52) U.S. Cl.
CPC .......... *G06F 3/0481* (2013.01); *G06F 3/0483* (2013.01); *G06F 3/04842* (2013.01);
(Continued)

(58) Field of Classification Search
CPC .. G06F 3/0481; G06F 3/0483; G06F 3/04842; G06F 3/04883; G06F 3/04886;
(Continued)

(56) References Cited

U.S. PATENT DOCUMENTS 5,539,427 A * 7/1996 Bricklin .............. G06F 16/5854
345/173
9,639,826 B2 5/2017 Yi et al.
(Continued)

FOREIGN PATENT DOCUMENTS

EP 3 792 739 A1 3/2021
KR 10-0380600 B1 4/2003
(Continued)

OTHER PUBLICATIONS

Extended European Search Report dated Oct. 18, 2024, issued in European Patent Application No. 22855994.4.
(Continued)

*Primary Examiner* — Daniel Samwel
(74) *Attorney, Agent, or Firm* — Jefferson IP Law, LLP

(57) ABSTRACT

An electronic device is provided. The electronic device includes a display including at least one display panel, a memory, and a processor operatively connected to the display module and the memory. The memory stores instructions causing the processor to generate content including one or more pages and at least one object being displayed on the one or more pages based on a user input, display an editing area for editing the content by using the display module, and simultaneously apply the at least one object being generated or changed based on the user input to at least one partial area of a first page and at least one partial area of a second page corresponding to the editing area in case that the at least
(Continued)

partial areas of the first page and the second page among the one or more pages are simultaneously displayed in the editing area.

20 Claims, 24 Drawing Sheets

(51) Int. Cl.

| | |
|---|---|
| *G06F 3/04842* | (2022.01) |
| *G06F 3/04883* | (2022.01) |
| *G06F 3/04886* | (2022.01) |
| *G06V 30/14* | (2022.01) |
| *G06V 30/32* | (2022.01) |

(52) U.S. Cl.
CPC ...... *G06F 3/04883* (2013.01); *G06F 3/04886* (2013.01); *G06V 30/1456* (2022.01); *G06V 30/347* (2022.01); *G06F 2203/04806* (2013.01)

(58) Field of Classification Search
CPC ...... G06F 2203/04806; G06V 30/1456; G06V 30/347
See application file for complete search history.

(56) References Cited

U.S. PATENT DOCUMENTS

| | | | |
|---|---|---|---|
| 10,747,949 B2 | 8/2020 | Livingston et al. | |
| 2002/0097270 A1* | 7/2002 | Keely | G06F 3/0481 715/764 |
| 2004/0068698 A1* | 4/2004 | Wu | G06F 40/143 715/251 |
| 2004/0205623 A1* | 10/2004 | Weil | G06F 40/114 715/251 |
| 2005/0034068 A1* | 2/2005 | Jaeger | G06F 40/166 715/251 |
| 2008/0122806 A1 | 5/2008 | Ahn | |

| | | | |
|---|---|---|---|
| 2012/0192057 A1 | 7/2012 | Migos et al. | |
| 2013/0159916 A1* | 6/2013 | Wadayama | G06F 3/0483 715/776 |
| 2013/0159917 A1* | 6/2013 | Loebach | G06F 3/0488 715/778 |
| 2013/0229324 A1* | 9/2013 | Zhang | G06F 3/1446 345/1.3 |
| 2014/0013216 A1 | 1/2014 | Sakuta | |
| 2014/0129931 A1 | 5/2014 | Hashiba | |
| 2014/0223386 A1 | 8/2014 | Huang et al. | |
| 2015/0098653 A1 | 4/2015 | Akashi | |
| 2015/0187338 A1* | 7/2015 | Lee | G06F 3/0481 345/173 |
| 2016/0179758 A1* | 6/2016 | Perrin | G06F 40/171 715/268 |
| 2017/0060819 A1 | 3/2017 | Rucine et al. | |
| 2017/0139563 A1 | 5/2017 | Konokawa | |
| 2018/0329580 A1* | 11/2018 | Aurongzeb | G09G 3/035 |
| 2020/0356254 A1 | 11/2020 | Missig et al. | |
| 2021/0042027 A1 | 2/2021 | Lee et al. | |
| 2021/0056878 A1 | 2/2021 | Lee et al. | |
| 2021/0081604 A1 | 3/2021 | Rucine et al. | |
| 2022/0413553 A1* | 12/2022 | Zhang | G06F 1/1686 |

FOREIGN PATENT DOCUMENTS

| | | |
|---|---|---|
| KR | 10-2005-0097111 A | 10/2005 |
| KR | 10-2006-0080557 A | 7/2006 |
| KR | 10-1358506 B1 | 2/2014 |
| KR | 10-1680810 B1 | 11/2016 |
| KR | 10-2160249 B1 | 9/2020 |

OTHER PUBLICATIONS

International Search Report dated Sep. 15, 2022, issued in International Application No. PCT/KR2022/008460.
Korean Office Action with English translation dated Oct. 23, 2025; Korean Appln. No. 10-2021-0105569.

* cited by examiner

Memory 130

Processor 120

Display module 160

First display panel 161

Second display panel 162

[b]

[a]

[a]               [b]

[a]               [b]

[a]                    [b]

[a]                    [b]

ELECTRONIC DEVICE AND METHOD FOR EDITING CONTENT THEREOF

CROSS-REFERENCE TO RELATED APPLICATION(S)

This application is a continuation application, claiming priority under § 365(c), of an International application No. PCT/KR2022/008460, filed on Jun. 15, 2022, which is based on and claims the benefit of a Korean patent application number 10-2021-0105569, filed on Aug. 10, 2021, in the Korean Intellectual Property Office, the disclosure of which is incorporated by reference herein in its entirety.

TECHNICAL FIELD

The disclosure relates to an electronic device. More particularly, the disclosure relates to a method for simultaneously editing a plurality of pages included in content when generating and/or editing the content through the electronic device.

BACKGROUND ART

With the development of mobile communication and hardware/software technologies, a portable electronic device (hereinafter, electronic device) that is represented by a smart phone can be mounted with various functions. The electronic device may perform a specific function by connecting to various external devices. For example, in order to enable a user to easily access various functions, the electronic device may include a touchscreen-based display, and may provide screens of various applications through the display.

Recently, for a handwriting input on a display panel of an electronic device, such as a digitizer, a tablet personal computer (PC), or a smart phone, a pen type device (hereinafter, electronic pen), such as a stylus pen, has been provided as an input means. As the electronic pen, an electromagnetic resonance type electronic pen using resonance by electromagnetic induction or an active electrostatic type electronic pen may be used. The electronic device may receive the handwriting input from the electronic pen.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

An electronic device may often switch a display method for an area necessary for editing content in accordance with a user input, and may generate various kinds of contents based on the user input.

Aspects of the disclosure are to address at least the above-mentioned problems and/or disadvantages and to provide at least the advantages described below. Accordingly, an aspect of the disclosure is to provide an electronic device enabling a user to easily identify and edit contents, and a method for generating contents of the electronic device.

Recently, since content being separated into pages, such as a document, can be generated and edited particularly by various types of electronic devices, such as a digitizer, a tablet PC, and a smart phone, an intuitive editing method may be requested by a user based on the screen size and usability by kinds of the electronic devices.

Additional aspects will be set forth in part in the description which follows and, in part, will be apparent from the description, or may be learned by practice of the presented embodiments.

Solution to Problem

In accordance with an aspect of the disclosure, an electronic device is provided. The electronic device includes a display module including at least one display panel, a memory, and a processor operatively connected to the display module and the memory, wherein the memory stores instructions causing the processor to generate content including one or more pages and at least one object being displayed on the one or more pages based on a user input, display, on the display, an editing area for editing the content, and simultaneously apply the at least one object being generated or changed based on the user input to at least one partial area of a first page and at least one partial area of a second page corresponding to the editing area in case that the at least partial areas of the first page and the second page among the one or more pages are simultaneously displayed in the editing area.

In accordance with another aspect of the disclosure, a method by an electronic device for editing contents is provided. The method includes generating contents including one or more pages and at least one object being displayed on the one or more pages based on a user input, displaying an editing area for editing the content to an outside, and simultaneously applying the at least one object being generated or changed based on the user input to at least one partial area of a first page and at least one partial area of a second page corresponding to the editing area in case that the at least partial areas of the first page and the second page among the one or more pages are simultaneously displayed in the editing area.

Advantageous Effects of Invention

According to various embodiments, the user experience, editing efficiency, and intuition can be improved by simultaneously editing two or more pages when editing content including a plurality of pages.

According to various embodiments, an optimum editing and outputting method can be provided for the content composed of pages having different paper sizes and paper directions.

According to an embodiment, convenience in editing the content can be provided even on various kinds of displays of electronic devices by providing paper sizes suitable for portable electronic devices.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIG. 5 is a block diagram of an electronic device according to an embodiment of the disclosure;

Throughout the drawings, it should be noted that like reference numbers are used to depict the same or similar elements, features, and structures.

MODE FOR THE INVENTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
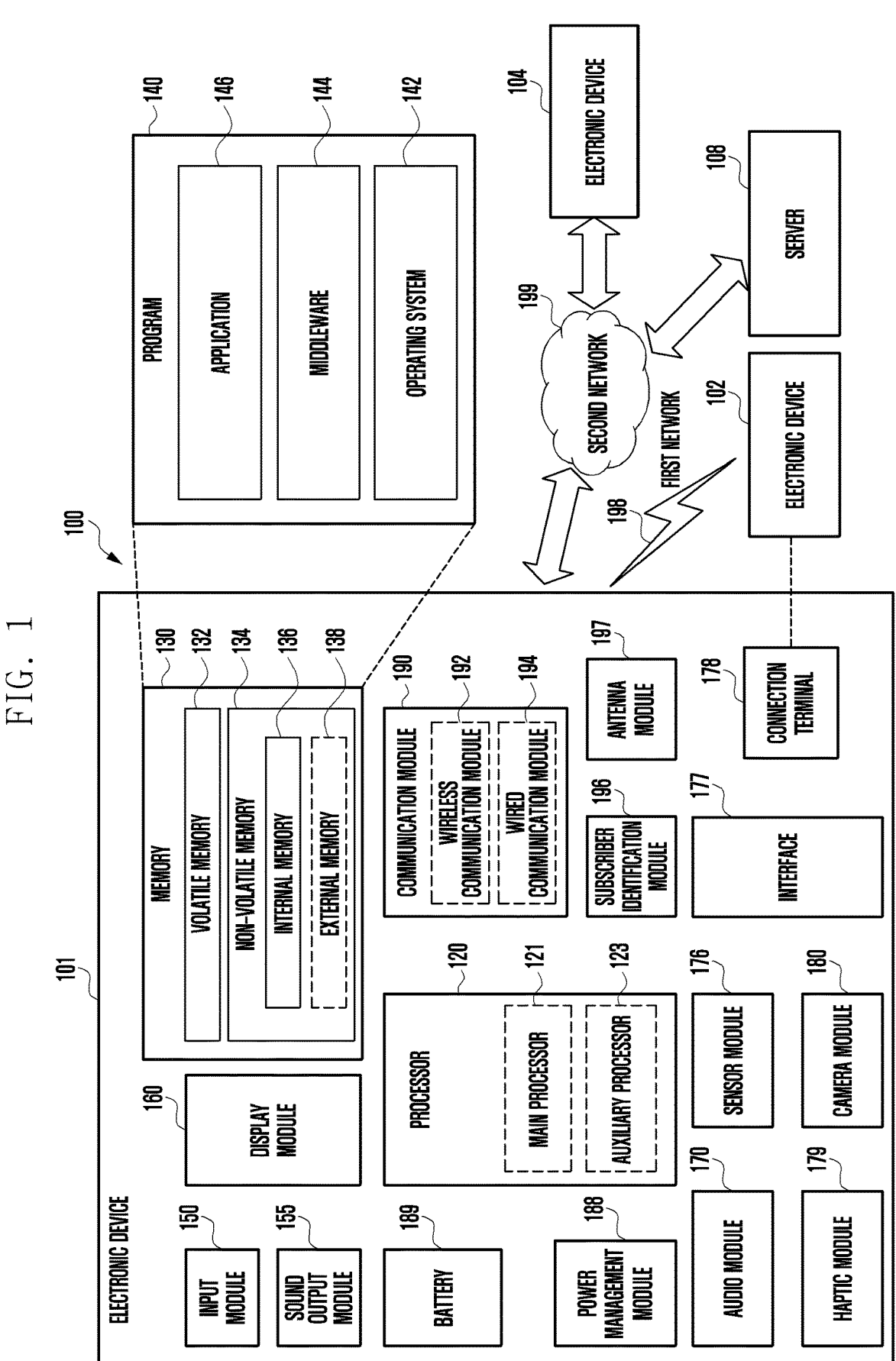
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and a next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, an RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
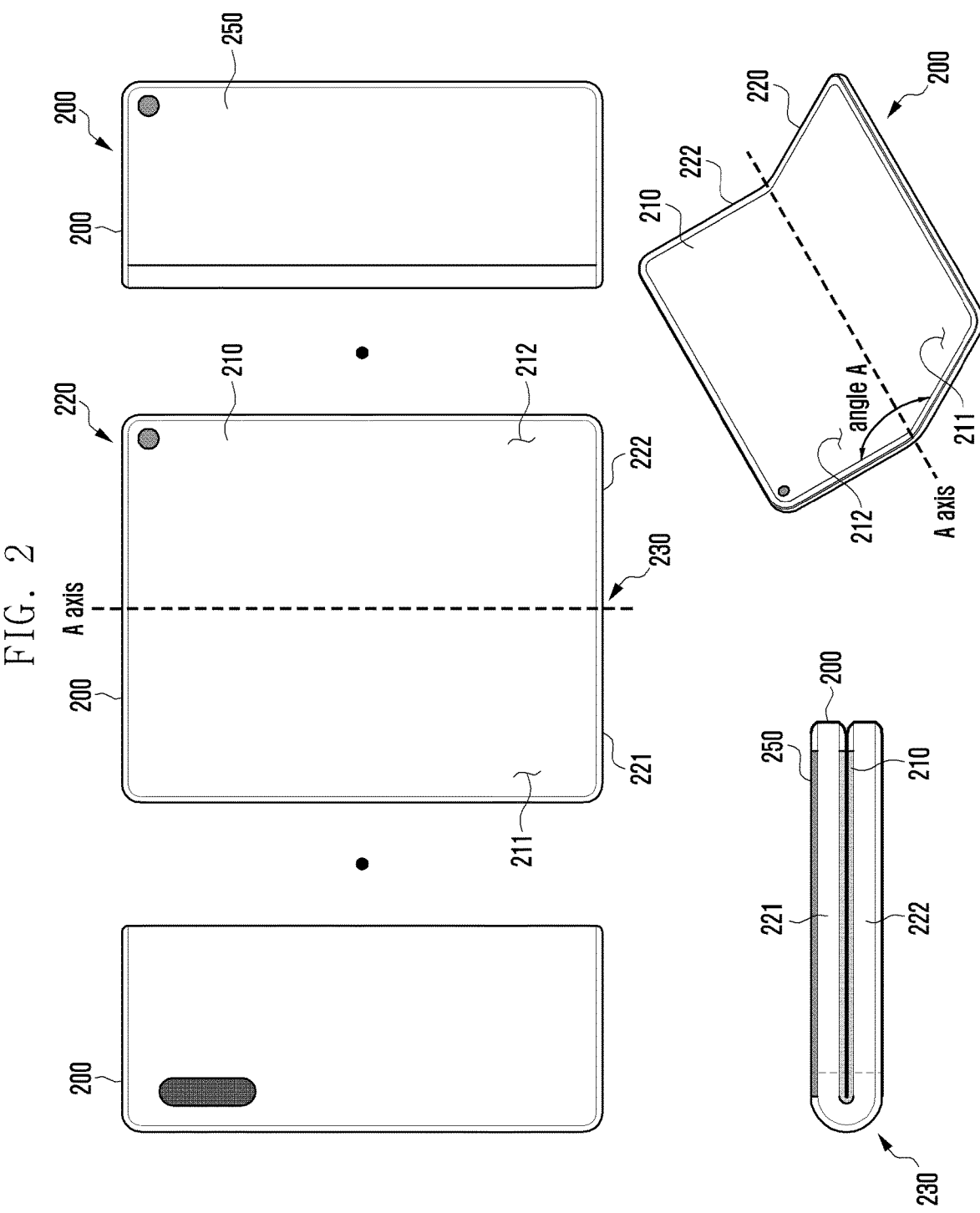
FIG. 2 is a diagram illustrating the structure and shape change of an electronic device including a flexible display according to an embodiment of the disclosure.

FIG. 2 is a diagram illustrating the structure and shape change of an electronic device including a flexible display according to an embodiment of the disclosure.

Figure 5:
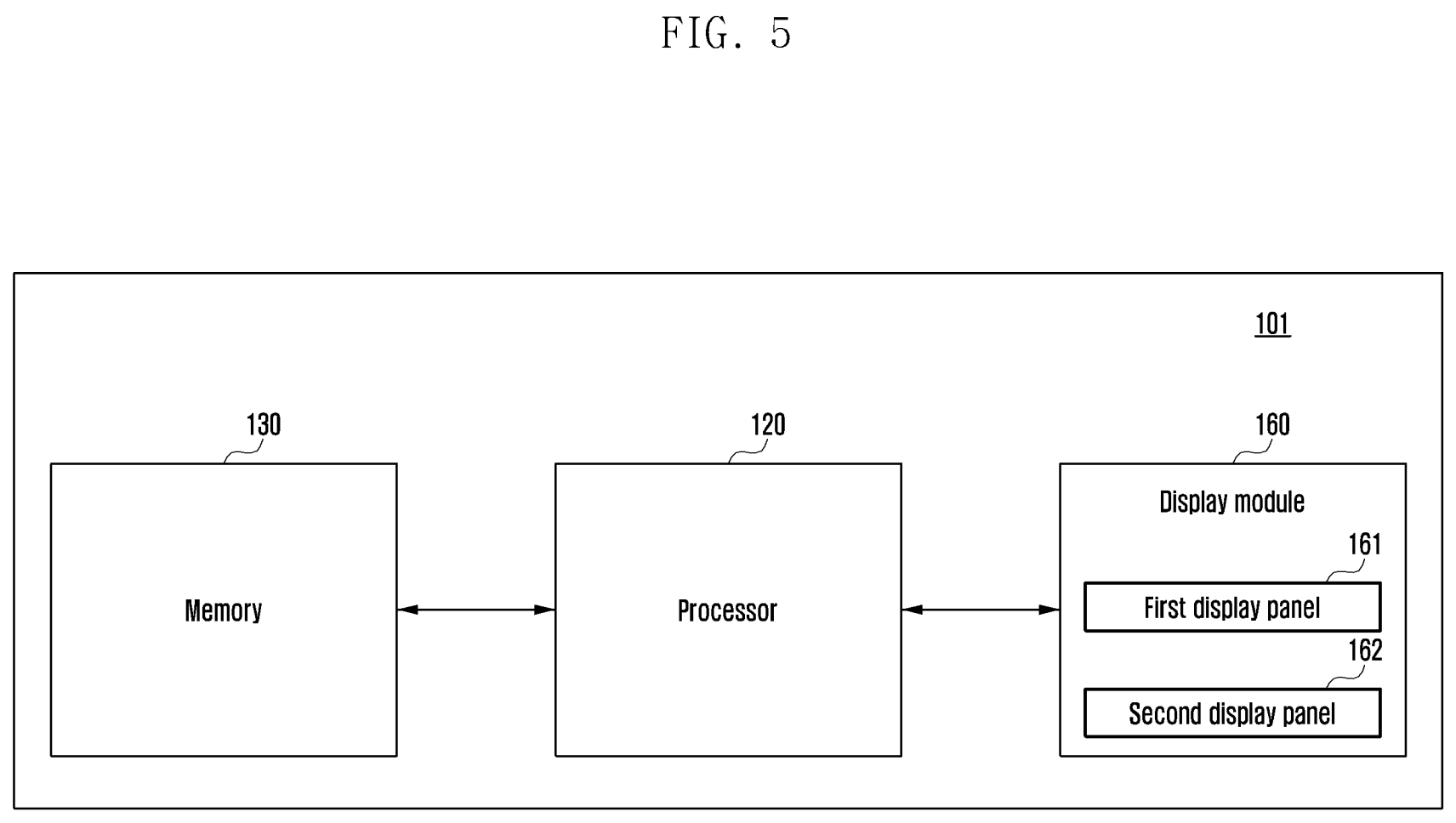

Referring to FIG. 2, an electronic device 200 (e.g., electronic device 101 of FIG. 1) provided with a flexible display 210 according to may be a foldable electronic device. A housing structure 220 of the electronic device 200 may be composed of two housings (e.g., first housing 221 and/or second housing 222) and a hinge part 230. The first housing 221 may include a first surface and a second surface, and the second housing 222 may include a third surface and a fourth surface. For example, if a first display 210 of the electronic device 200 is folded based on an A axis, the first surface of the first housing 221 and the third surface of the second housing 222 may be folded to face each other. A case that the electronic device 200 is in a folded state may be, for example, a case that an angle (e.g., angle A) between the first surface of the first housing 221 and the third surface of the second housing 222 may be a narrow angle (e.g., 0 to 5 degrees). A folded state may mean a folded state, a close state, or a closed state, and may mean a completely folded state of the electronic device 200. The first display 210 may be separated into a first area 211 and a second area 212 as separated areas through being physically folded, and the first area may be located on the first surface of the first housing 221, and the second area may be located on the third surface of the second housing 222. The first housing 221 and the second housing 222 may be disposed on both sides around a folding axis (e.g., A axis), and may have a symmetric shape as a while around the folding axis. With reference to FIG. 5, the first housing 221 may be located on the left side based on the folding axis, and the second housing 222 may be located on the right side based on the folding axis. The first housing 221 and the second housing 222 may be designed to be folded on each other, and in the folded or closed state, the first surface of the first housing 221 and the third surface of the second housing 222 may overlap each other to face each other.

The hinge part 230 may be formed between the first housing 221 and the second housing 222, and thus the first housing 221 and the second housing 222 of the electronic device 200 may be folded to overlap each other. According to an embodiment, the first housing 221 and the second housing 222 may be connected through the hinge part 230. However, the housing structure disposed on the left and right sides based on the folding axis (e.g., A axis) is merely an example, and the electronic device may have housings disposed on the upper and lower sides based on the folding axis. The hinge part 230 may be disposed along the axis A.

The shape of the housing structure 220 of the electronic device 200 may be varied. For example, based on the hinge part 230, the first housing 221 and the second housing 222 may move to be folded or unfolded. The first housing 221 and the second housing 22 may form a folding angle (e.g., angle A). The folding angle (e.g., angle A) may be changed. For example, the angle A may be in the range of 0 to 180 degrees. As another example, the angle A may be in the range of 0 to 360 degrees. The first housing 221 and the second housing 222 may have different angles (e.g., angle A) or distances therebetween depending on whether the electronic device 200 is in an unfolded state (or in an open state), in a folded state (or in a closed state), or in an intermediate state. For example, the unfolded state may mean an open state (or opened state), a flat (or even) state, or an opened state. The unfolded state of the first display 210 of the electronic device 200 may be a state where the first housing 221 and the second housing 222 are disposed side by side, and may mean the state in which the electronic device 200 is completely unfolded. The unfolded state of the first display 210 may be the state where the angle A is 180 degrees. In the unfolded state of the electronic device 200, the first surface of the first housing 221 and the third surface of the second housing 222 may be disposed to be in the same direction.

The intermediate state of the first display of the electronic device 200 may be a state where the first housing 221 and the second housing are disposed at a specific angle, and may not be the folded state or the unfolded state. The intermediate state may mean the state in which the angle A is a specific angle (e.g., 6 to 179 degrees).

The electronic device 200 may be provided with a second display 250 (e.g., display module 160 of FIG. 1) on at least a part of the first housing 221 or the second housing 222. With reference to FIG. 5, the second display may be formed on at least a part of the second surface of the first housing 221 of the electronic device 200. The second display 550 may be disposed on the fourth surface of the second housing 222, or may be formed over some or all of the second surface of the first housing 221 and the fourth surface of the second housing 222. The second display may include the structure and/or the function of the display module 160 of FIG. 1.

According to various embodiments of the disclosure, although not illustrated, the electronic device 200 may include a sensor module and/or a camera module.

The sensor module may be disposed under the display 210 (e.g., −Z direction from the display 210), and may detect an external environment based on information (e.g., light) received through the display 210. The sensor module may include at least one of a receiver, a proximity sensor, an ultrasonic sensor, a gesture sensor, a gyro sensor, a barometric pressure sensor, a magnetic sensor, an acceleration sensor, a grip sensor, a color sensor, an infrared (IR) sensor, a bio-sensor, a temperature sensor, or a humidity sensor. According to an embodiment, at least some sensor modules of the electronic device 200 may be visually exposed to an outside through partial areas of the display 210. According to an embodiment, the electronic device 200 may sense the folding angle (e.g., angle A) by using the sensor module.

The electronic device 200 may be provided with at least one of the sensors (e.g., acceleration sensor, gyro sensor, and/or magnetic sensor) in each of the plurality of housings (e.g., first housing 221 and/or second housing 222). For example, the electronic device 200 may be provided with the sensors (e.g., acceleration sensor, gyro sensor, and/or magnetic sensor) in only one of the plurality of housings (e.g., first housing 221 and/or second housing 222).

Figure 3:
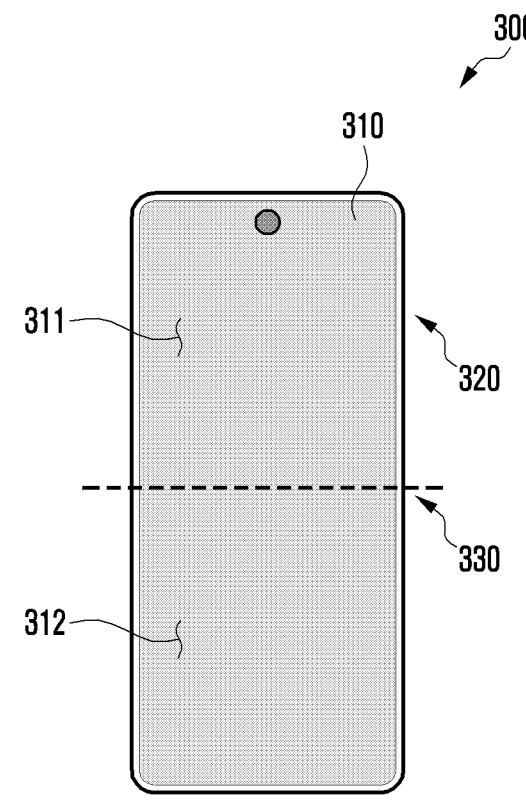
FIG. 3 is a diagram illustrating the structure and shape change of an electronic device including a flexible display according to an embodiment of the disclosure.
Figure 3:
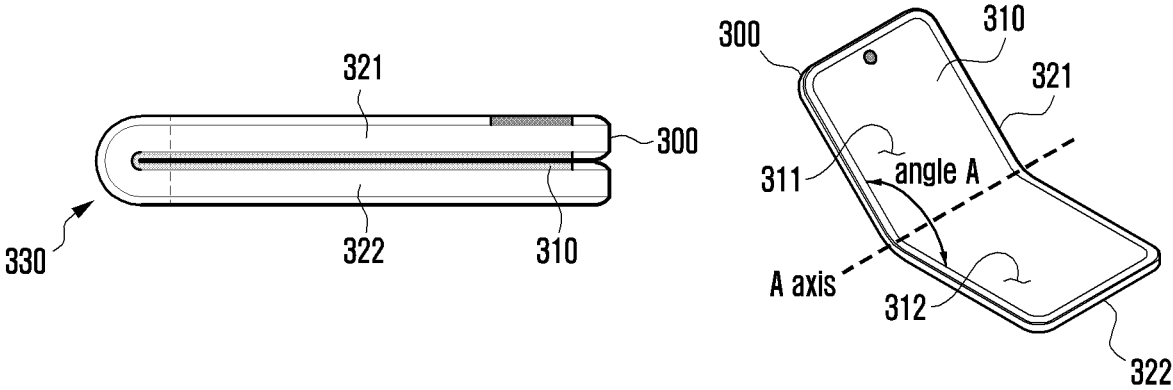

FIG. 3 is a diagram illustrating the structure and shape change of an electronic device including a flexible display according to an embodiment of the disclosure.

Referring to FIG. 3, a foldable electronic device 300 (e.g., electronic device 101 of FIG. 1) may include a housing structure 320 including two housings (e.g., first housing 321 and/or second housing 322) based on a folding axis (e.g., A axis), a foldable display 310 (e.g., display module 160 of FIG. 1), and/or a hinge part 330, and may include at least parts of the structure and/or the function of the electronic device 101 of FIG. 1. The two housings (e.g., first housing 321 and/or second housing 322) may overlap each other by the hinge part 330, and may be folded and overlap each other around at least one axis.

The housing structure 320 may include the first housing 321, the second housing 322, and/or the hinge part 330. The first housing 321 may include a first surface and a second surface, and the second housing 322 may include a third surface and a fourth surface. For example, in case that the display 310 of the electronic device 300 is folded based on the hinge part 330 (e.g., A axis), the first surface of the first housing 321 and the third surface of the second housing 322 may overlap each other to face each other. A case that the electronic device 300 is in a folded state may be, for example, a case that an angle (e.g., angle A) between the first surface of the first housing 321 and the third surface of the second housing 322 may be a narrow angle (e.g., 0 to 5 degrees). The folded state may mean a close state or a closed state, and may mean that the electronic device 300 is completely folded. The display 310 may be separated into a first area 311 and the second area 312 as physically separated areas based on the axis A, and the first area may be located on the first surface of the first housing 321, and the second area may be located on the third surface of the second housing 322.

The first housing 321 and the second housing 322 may be disposed on the upper and lower sides around the hinge part 330 (e.g., A axis), and may have a symmetric shape as a while around the hinge part 330. With reference to FIG. 3, the first housing 321 may be located on the upper side based on the folding axis (e.g., A axis), and the second housing 322 may be located on the lower side based on the folding axis. The first housing 321 and the second housing 322 may be designed to be folded on each other, and in the folded or closed state, the first surface of the first housing 321 and the third surface of the second housing 322 may overlap each other to face each other.

The hinge part 330 may be formed between the first housing 321 and the second housing 322, and thus the first housing 321 and the second housing 322 of the electronic device 300 may be folded to overlap each other. However, the housing structure disposed on the upper and lower sides based on the folding axis (e.g., A axis) is merely an example, and the electronic device may have housings disposed on the left and right sides based on the folding axis.

The shape of the housing structure 320 of the electronic device 300 may be varied. For example, based on the hinge part 330, the first housing 321 and the second housing 322 may move to be folded or unfolded. According to an embodiment, the first housing 321 and the second housing 322 may form a folding angle (e.g., angle A). The folding angle (e.g., angle A) may be changed. For example, the angle A may be in the range of 0 to 180 degrees. As another example, the angle A may be in the range of 0 to 360 degrees. The first housing 321 and the second housing 322 may have different angles or distances therebetween depending on whether the electronic device 300 is in an unfolded state (or in an open state), in a folded state (or in a closed state), or in an intermediate state. For example, the unfolded state may mean an open state (or opened state), a flat (or even) state, or an opened state. The unfolded state of the first display 310 of the electronic device 300 may be a state where the first housing 321 and the second housing 322 are disposed on the upper and lower sides, and may mean the state in which the electronic device 300 is completely unfolded. The unfolded state of the electronic device may be the state where the angle between the first housing 321 and the second housing 322 is 180 degrees, and the first surface of the first housing 321 and the third surface of the second housing 322 may be disposed to be in the same direction. The intermediate state of the electronic device 300 may be a state where the first housing 321 and the second housing 322 are disposed at a specific angle, and may not be the folded state or the unfolded state. The intermediate state may mean the state in which the angle A is a specific angle (e.g., 6 to 179 degrees).

According to various embodiments of the disclosure, although not illustrated, the electronic device 300 may include a sensor module and/or a camera module.

The sensor module may be disposed under the display 310 (e.g., −Z direction from the display 310), and may detect an external environment based on information (e.g., light) received through the display 310. The sensor module may include at least one of a receiver, a proximity sensor, an ultrasonic sensor, a gesture sensor, a gyro sensor, a barometric pressure sensor, a magnetic sensor, an acceleration sensor, a grip sensor, a color sensor, an infrared (IR) sensor, a bio-sensor, a temperature sensor, or a humidity sensor. At least one sensor module of the electronic device 300 may be visually exposed to an outside through partial areas of the display 310. The electronic device 300 may sense the folding angle (e.g., angle A) by using the sensor module. The electronic device 300 may be provided with at least one of the sensors (e.g., acceleration sensor, gyro sensor, and/or magnetic sensor) in each of the plurality of housings (e.g., first housing 321 and/or second housing 322). For example, the electronic device 300 may be provided with the sensors (e.g., acceleration sensor, gyro sensor, and/or magnetic sensor) in only one of the plurality of housings (e.g., first housing 321 and/or second housing 322).

Figure 4:
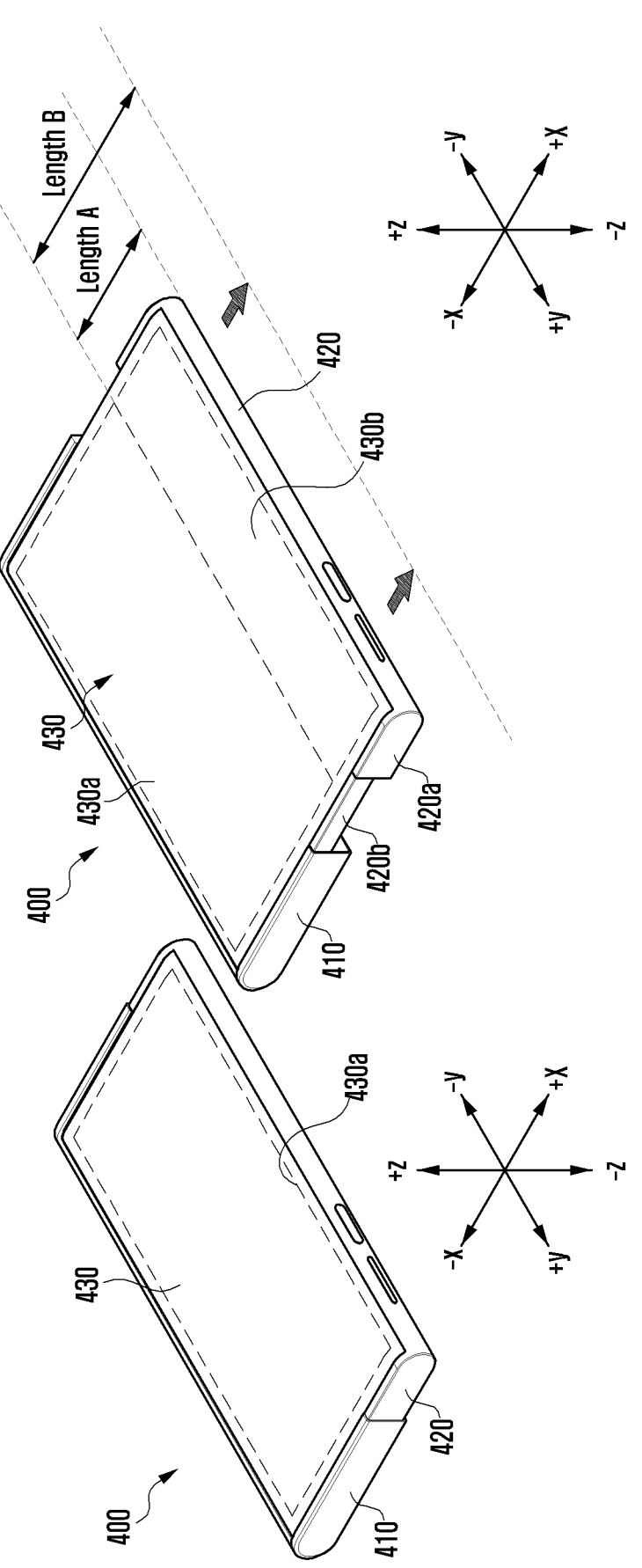
FIG. 4 is a diagram illustrating the structure and shape change of an electronic device including a flexible display according to an embodiment of the disclosure.

FIG. 4 is a diagram illustrating the structure and shape change of an electronic device including a flexible display according to an embodiment of the disclosure.

Referring to FIG. 4, an electronic device 400 (e.g., electronic device 101 of FIG. 1) may include a first housing 410 and a second housing 420. The second housing 420 may move from the first housing 410 in a designated direction, for example, in a first direction (+X direction). For example, the second housing 420 may move to slide from the first housing 410 by a designated distance in the first direction (+X direction). The second housing 420 may reciprocate from one part of the first housing within a designated distance range in the first direction (+X direction).

A state where the second housing 420 has moved to slide from the first housing 410 in the first direction (+X direction) may be defined as a second state (e.g., expanded state or slide-out state). The second state of the electronic device 400 may be defined as a state where a second part 430b of the display 430 is visually exposed to the outside. The second housing 420 may move from the first housing 410 in the first direction (+X direction) to cause at least a part of the second housing 420 and/or the second part 430b of the display 430 to be drawn out, and a draw-out length (e.g., length A) may be formed corresponding to the movement distance. The second housing 420 may reciprocate within a designated distance (e.g., length A). According to an embodiment, the draw-out length (e.g., length A) may be 0 to length B.

A state where the second housing 420 has moved to slide in the direction of the first housing 410, for example, in a second direction (−X direction) that is opposite to the first direction (+X direction) may be defined as a first state (e.g., contracted state or slide-in state) of the electronic device 400. The first state of the electronic device 400 may be defined as a state where the second part 430b of the display 430 is not visually exposed to the outside.

The first state may be called a first shape, and the second state may be called a second shape. For example, the first shape may include a normal state, a reduced state, or a closed state, and the second shape may include an open state. Further, the electronic device 400 may form a third state (e.g., intermediate state) that is a state between the first state and the second state. For example, the third state may be called a third shape, and the third shape may include a free stop state.

The electronic device 400 may switch the second state and/or the first state to each other manually through a user's operation or automatically through a driving module (not illustrated) disposed inside the first housing 410 or the second housing 420. The operation of the driving module may be triggered based on a user input. According to an embodiment of the disclosure, the user input for triggering the operation of the driving module may include a touch input, a force touch input, and/or a gesture input through the display 430. In another embodiment of the disclosure, the user input for triggering the operation of the driving module may include a voice input and an input of a physical button exposed out of the first housing 410 or the second housing 420. The driving module may be driven in a semi-automatic manner in which the operation of the driving module is triggered in case that a manual operation by user's external force is sensed.

As the second housing 420 is designed to move to slide, the electronic device 400 may be named a "slidable electronic device", or as at least a part of the display 430 is designed to be wound inside the second housing 420 (or first housing 410) based on the slide movement of the second housing 420, the electronic device 400 may be named a "rollable electronic device".

In the electronic device 400, the second housing 420 may be at least partly slidably combined with the first housing 410 to be movable from the first housing 410. The combination shape of the first housing 410 and the second housing 420 is not limited to the shape and combination illustrated in FIG. 4, and may be implemented by combination and/or engagement of other shapes or components.

The second housing 420 of the electronic device 400 may include side members 420a and 420b surrounding at least one side of the electronic device 400. The side members 420a and 420b of the second housing 420 may include a first side member 420a being always visually exposed to an outside in the second state or the first state of the electronic device 400 without being inserted into the second housing 420, and a second side member 420b being inserted into or drawn out of an inner space of the second housing through one end of the second housing 420.

The second side member 420b of the second housing 420 may not be visually exposed to the outside in the first state, and may be visually exposed to the outside in the second state.

The display 430 may be disposed to be visually exposed to the outside in the front direction (e.g., +Z direction) of the first housing 410 and the second housing 420. The display area of the display 430 may be defined to include the first part 430a and the second part 430b.

The first part 430a of the display 430 may be the display area being visually exposed to the outside in a fixed manner regardless of whether the electronic device 400 is in the second state or in the first state. For example, the first part 430a of the display may be fixed without movement regardless of the slide movement of the second housing 420.

The second part 430b of the display 430 may be the display area extending from one end of the first part 430a, and in interlocking with the slide movement of the second housing 420, the second part 430b may enter into or may be drawn out of the inner space of the second housing 420. A hole (not illustrated) through which the second part 430b of the display 430 enters or is drawn out may be disposed adjacent to the +X-direction side of the second housing 420. For example, the second part 430b of the display 430 may be drawn out of or may enter into the +X-direction boundary part of the second housing 420.

In the second state, the second part 430b of the display 430 may be drawn out from the inner space of the second housing 420, and may be visually exposed to the outside. In the first state, the second part 430b of the display 430 may enter into the inner space of the second housing 420, and may not be visually exposed to the outside.

The second part 430b of the display 430 may include a flexible display. In the first state, the second part 430b may be rolled up and enter into the inner space of the second housing 420 in a bent state.

In the first state, as the display area of the display 430, only the first part 430a of the display 430 may be visually exposed to the outside.

In the second state, as the display area of the display 430, the first part 430a and the second part 430b of the display 430 may be visually exposed to the outside.

According to various embodiments of the disclosure, although not illustrated, the electronic device 400 may include a sensor module and/or a camera module.

The sensor module may be disposed under the display 430 (e.g., −Z direction from the display 430), and may detect an external environment based on information (e.g., light) received through the display 430. The sensor module may include at least one of a receiver, a proximity sensor, an ultrasonic sensor, a gesture sensor, a gyro sensor, a barometric pressure sensor, a magnetic sensor, an acceleration sensor, a grip sensor, a color sensor, an infrared (IR) sensor, a bio-sensor, a temperature sensor, a humidity sensor, a motor encoder, or an indicator. At least one sensor module of the electronic device 400 may be visually exposed to an outside through partial areas of the display 430. The electronic device 400 may sense the draw-out length (e.g., length A) by using the sensor module.

The electronic device 400 may include housings (e.g., first housing 410 and second housing 420), and a display 430 being supported by the housings 410 and 420 and having an area of the display area being adjusted in interlocking with the movement of at least parts of the housings 410 and 420 in the first direction, wherein the display 430 may include the first part 430a being fixedly exposed to the outside regardless of the movement of the at least parts of the housings 410 and 420 in the first direction to vary the display area, and the second part 430b extending from one end of the first part 430a, and being exposed to the outside by being drawn out from the inner space of the housings 410 and 420 in interlocking with the movement of the at least parts of the housings 410 and 420 in the first direction.

FIG. 5 is a block diagram of an electronic device according to an embodiment of the disclosure.

Referring to FIG. 5, the electronic device 101 may include a processor 120, a memory 130, and a display module 160, and some of the illustrated configurations may be omitted or replaced. The electronic device 101 may include at least parts of the configuration and/or the function of the electronic device of FIG. 1. The electronic device 101 may include one of the structures illustrated in FIGS. 2, 3, and 4.

The display module 160 may visually display information out of the electronic device 101. The display module 160 may include a flexible display on at least a part thereof. In accordance with the folded and unfolded state of the housings, the flexible display may be exposed to the outside in the unfolded state, or may be folded in a state where some areas of the flexible display between the housings face each other. The flexible display may enter into the inside of the housing in a wound state, or may be exposed to the outside in the unfolded state. The flexible display may display information only for the part exposed to the outside. The display module 160 may include a touch sensor sensing a touch, and a pressure sensor sensing a force touch. The display module 160 may sense a touch with an external object (e.g., user) by using the touch sensor and/or the pressure sensor. The display module 160 may include two or more display panels (e.g., first display panel 161 and second display panel 162). The plurality of display panels 161 and 162 may be connected to each other in a manner that if any one of the plurality of display panels 161 and 162 is activated, the other is deactivated. The display module 160 may receive a handwriting input from a pen type device (hereinafter, electronic pen), such as a stylus pen. The electronic pen may be of an electromagnetic resonance (EMR) type using the resonance by the electromagnetic induction or an active electrostatic scheme (AES) type. The display module 160 may receive the handwriting input from the electronic pen by the electromagnetic resonance type or by the active electrostatic type.

The memory 130 may be connected to the processor 120 functionally, operatively, and/or electrically, and may store various instructions that may be performed by the processor 120. Such instructions may include various control commands including arithmetic and logical operations, data movement, and input/output that can be recognized by the processor.

The processor 120 may be configured to control constituent elements of the electronic device 101 and/or operations or data processing for communication, and may include at least part of the configuration and/or the function of the processor 120 of FIG. 1. The processor 120 may be connected to internal constituent elements of the electronic device 101 including the display module 160 and the memory 130 functionally, operatively, and/or electrically.

Although there is no limit in operations and data processing functions that the processor 120 can implement in the electronic device 101, in the disclosure, various embodiments for generating content in accordance with the user input on the display module 160 and editing the generated content will be described.

The operations of the processor 120 to be described later may be performed by loading instructions stored in the memory 130.

The processor 120 may generate various types of content. The content may be multimedia content including one or more pages. The one or more pages may mean partitions for visually separating the contents of the content. The content may be document type content. The content may include at least one object on the page. The at least one object may include any one of text, image, table, handwriting object, audio, web page, and portable document format (PDF). The at least one object may be separated into one or more minimum units. The minimum unit may be determined depending on the type of the object. For example, if the object type is the handwriting object, the minimum unit may be a single stroke, and if the object type is the text, the minimum unit may be a single text letter. If the object type is the table, the minimum unit may be a single cell, and if the object type is the image, the minimum unit may be a single image. The processor 120 may receive the user input, and may generate and/or change the one or more objects based on the user input. The processor 120 may receive the user input through the display module 160, an electronic pen, and an input module (e.g., input module 150 of FIG. 1).

The processor 120 may determine whether a plurality of pages are included in an editing area. The editing area may mean an area for receiving the user input in order to generate or edit the content. The pages included in the content may be displayed in the editing area. The processor 120 may determine whether the plurality of pages are simultaneously displayed in the editing area based on the number of pages being displayed at once in the editing area. The editing area may display an area including at least a part of the whole content area, and the processor 120 may generate and/or change the at least one object in the displayed editing area through reception of the user input.

If the plurality of pages are simultaneously displayed in the editing area, the processor 120 may simultaneously apply the at least one object being generated or changed based on the user input to the plurality of pages being simultaneously displayed. The simultaneous applying may be understood as handling of the plurality of pages included in the editing area as the whole area that can be edited at once. In the editing area, one or more objects may be generated, disposed, and/or changed (hereinafter, edited) across a page boundary regardless of the separation of the plurality of pages. For example, if the first object is generated across the first page and the second page being simultaneously displayed in the editing area, the first object may be simultaneously applied onto the first page and the second page.

When editing of one or more objects is completed, the edited object may be separated into the minimum units. The at least one object may be separated into one or more minimum units. The minimum unit may be determined depending on the type of the object. For example, if the object type is the handwriting object, the minimum unit may be a single stroke, and if the object type is the text, the minimum unit may be a single text letter. If the object type is the table, the minimum unit may be a single cell, and if the object type is the image, the minimum unit may be a single image. The processor 120 may separate the editing-completed object into the minimum units based on the object type.

The processor 120 may store the respective separated minimum units so as to be included on the corresponding pages. The page corresponding to the minimum unit may be determined based on the disposition location when the editing of the minimum units is completed. If one minimum unit is disposed across the plurality of pages, a partial area of the minimum unit may become the basis of the disposition location. For example, in case of the handwriting object, if one stroke is disposed across the first page and the second page, the location of the corresponding minimum unit may be determined based on the area in which the stroke starts. The processor 120 may separately dispose and store the separated minimum units on the corresponding pages, respectively. If the location in which the minimum unit is disposed does not belong to any page, for example, if the minimum unit is located in a blank area where the page is not present in the editing area, the processor 120 may include and store the minimum unit in the closest page among the plurality of pages.

The processor 120 may display a selection area in the editing area. The selection area may mean an area for selecting the whole or partial area among the one or more objects being displayed. For example, the selection area may be a partial area being selected in order to edit a specific object in the editing area. The selection area may include at least one graphical user interface (GUI) for adjusting the size thereof. The selection area may be an area for selecting at least a part of the handwriting object.

The processor 120 may display a preview area. The preview area may be an area for recognizing the handwriting object included in the selection area as text. The text recognition may mean recognition and conversion of the handwriting object into corresponding digital text. The processor 120 may recognize the handwriting object included in the selection area, and may display the recognized digital text on the preview area. The processor 120 may generate a new text object by transferring the digital text displayed on the preview area to the page in the editing area, or may copy and temporarily store the digital text in the memory 130.

The processor 120 may change the location of the preview area based on the selection area. A user may intend to use a handwriting object related function, such as text recognition of the handwriting object, based on the selection area, and in consideration of the user convenience, it may be preferable to minimize an area in which the preview area and the selection area overlap each other. Further, it may be preferable to dispose the preview area and the selection area in a close distance so as to facilitate the work at a glance. According to an embodiment, the processor 120 may dispose the preview area at a location where an overlapping area of the preview area and the selection area becomes minimized based on the location of the selection area. The processor 120 may dispose the preview area at the location closest to the selection area in the editing area. The processor 120 may determine the location of the preview area based on the location of the graphic user interface for adjusting the size and/or the location of the selection area.

The processor 120 may arrange the handwriting object. The processor 120 may separate the handwriting object into one or more lines. The handwriting object may include a plurality of strokes, and the processor 120 may separate the handwriting object into one or more letters or one or more lines based on the locations of the plurality of strokes. The processor 120 may arrange the handwriting object based on the locations of the separated letters and/or lines. For example, the processor 120 may arrange the handwriting object by rotating the handwriting object through the change of the locations of the plurality of strokes based on the separated letters and/or lines.

The processor 120 may display a zoom area in the editing area. The zoom area may be an area in which at least a partial area of the editing area is enlarged and displayed. The processor 120 may enlarge and display the area included in the selection area in the zoom area. The processor 120 may receive the user input through the zoom area, and may display the input result on a corresponding part of the selection area based on the received input.

The processor 120 may separately configure a part in which background text editing is possible among the plurality of pages. The background text editing may mean content editing through a text input. The processor 120 may receive an input for separately configuring a page on which the background text editing is possible or a page on which the background text editing is not possible among the plurality of pages, and may display the background text input on another area excluding the page on which the background text editing is not possible.

The processor 120 may receive an input for moving the plurality of pages, and may move the plurality of pages based on the received input. The page movement may mean an operation of displaying another page in the editing area. The processor 120 may move the page through a gesture based on the touch input, such as swipe or fling. The processor 120 may identify the number of fingers being simultaneously touched when receiving the gesture based on the touch input. The processor 120 may change the number of pages moving at once based on the number of fingers being simultaneously touched. When receiving the touch input gesture, the processor 120 may move the page based on the number of fingers being simultaneously touched and the gesture progress direction. The processor 120 may move the page based on a numeral input. For example, the processor 120 may move the page by determining the number of pages moving at once based on the numeral input.

The processor 120 may display the moved page in the editing area based on the user input. In case of simultaneously displaying the plurality of pages in the editing area, the processor 120 may fix a specific page, and may move only the remaining page excluding the fixed page when receiving the input for moving the page.

The processor 120 may configure reference paper information. The reference paper information may be information becoming the basis of the arrangement, location, direction, and/or magnification of pages. The reference paper information may be determined based on any one page (e.g., first page) predetermined among the plurality of pages included in the content. For example, the reference paper information may include the size of the first page becoming the basis, direction (e.g., horizontal direction or vertical direction), scroll direction, and/or aspect ratio. The processor 120 may enlarge, reduce, and/or rotate the remaining page (e.g., second page) excluding the first page based on the reference paper information. For example, in case that the scroll direction is configured as the vertical direction, the processor 120 may enlarge or reduce all other pages so that the pages are displayed with the same horizontal length as the first page becoming the reference paper based on the reference paper information. In this case, the processor 120 may display the page (e.g., second page) being enlarged or reduced as much as the magnification so that the second page has the same horizontal length as the first page, and the object included in the page may also be displayed in an enlarged or reduced state based on the same magnification.

The processor 120 may identify the display state of the electronic device 101. The electronic device 101 may have various shapes, for example, the shape of the foldable electronic device, such as the electronic device 200 of FIG. 2 or the electronic device 300 of FIG. 3 and the plurality of display panels 210 and 250, or may have the shape of the rollable electronic device, such as the electronic device 400 of FIG. 4. The shape of the flexible display may be transformed based on the shape of the housing of the electronic device, and the areas being activated among the display areas or the displays being activated among the plurality of displays may differ from each other. The processor 120 may identify the state of the display, and may change the number of pages to be displayed in the editing area, the disposition of each page, or the direction of the page based on the size and/or the aspect ratio of the activated area in the display.

Figure 6A:
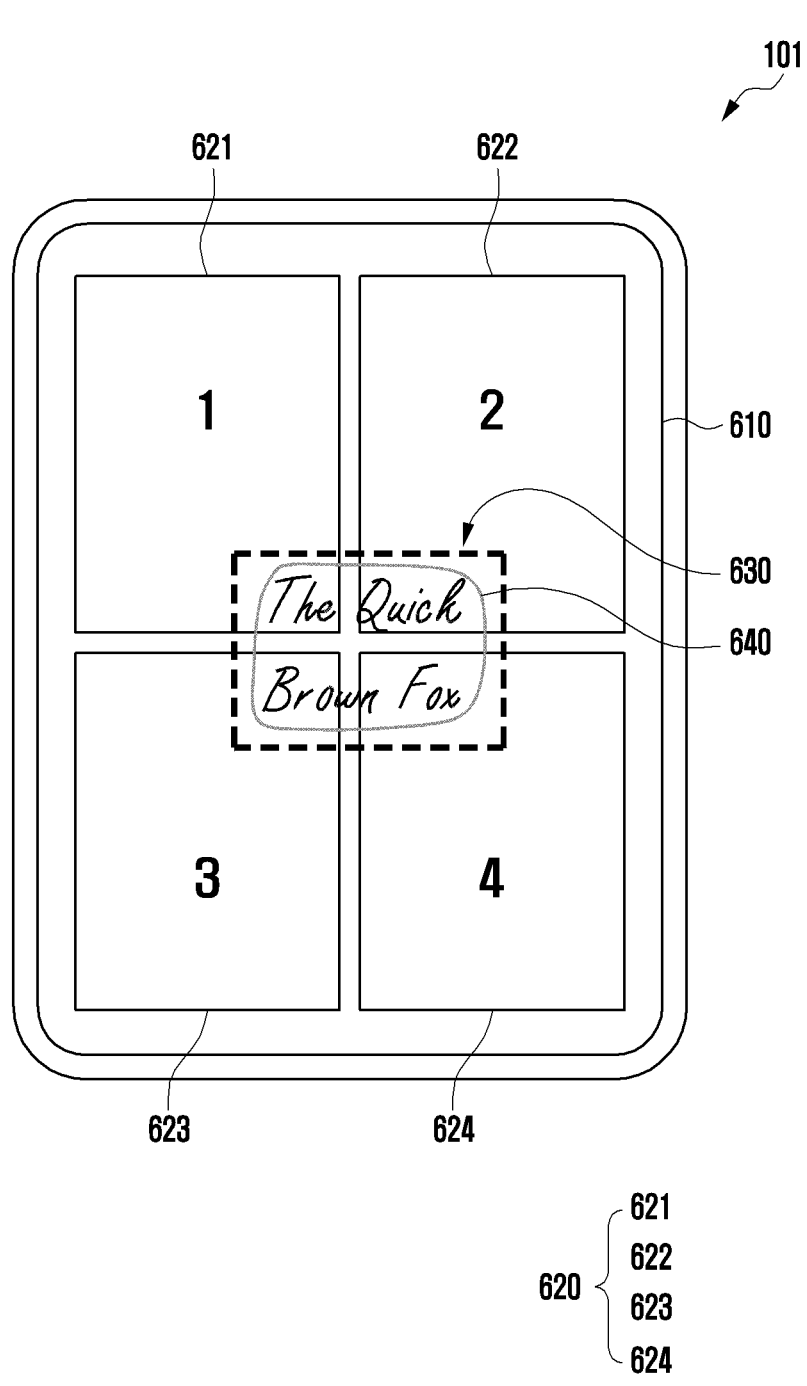
FIGS. 6A, 6B, and 6C illustrate a method in which an electronic device edits content including a plurality of pages according to various embodiments of the disclosure.
Figure 6B:
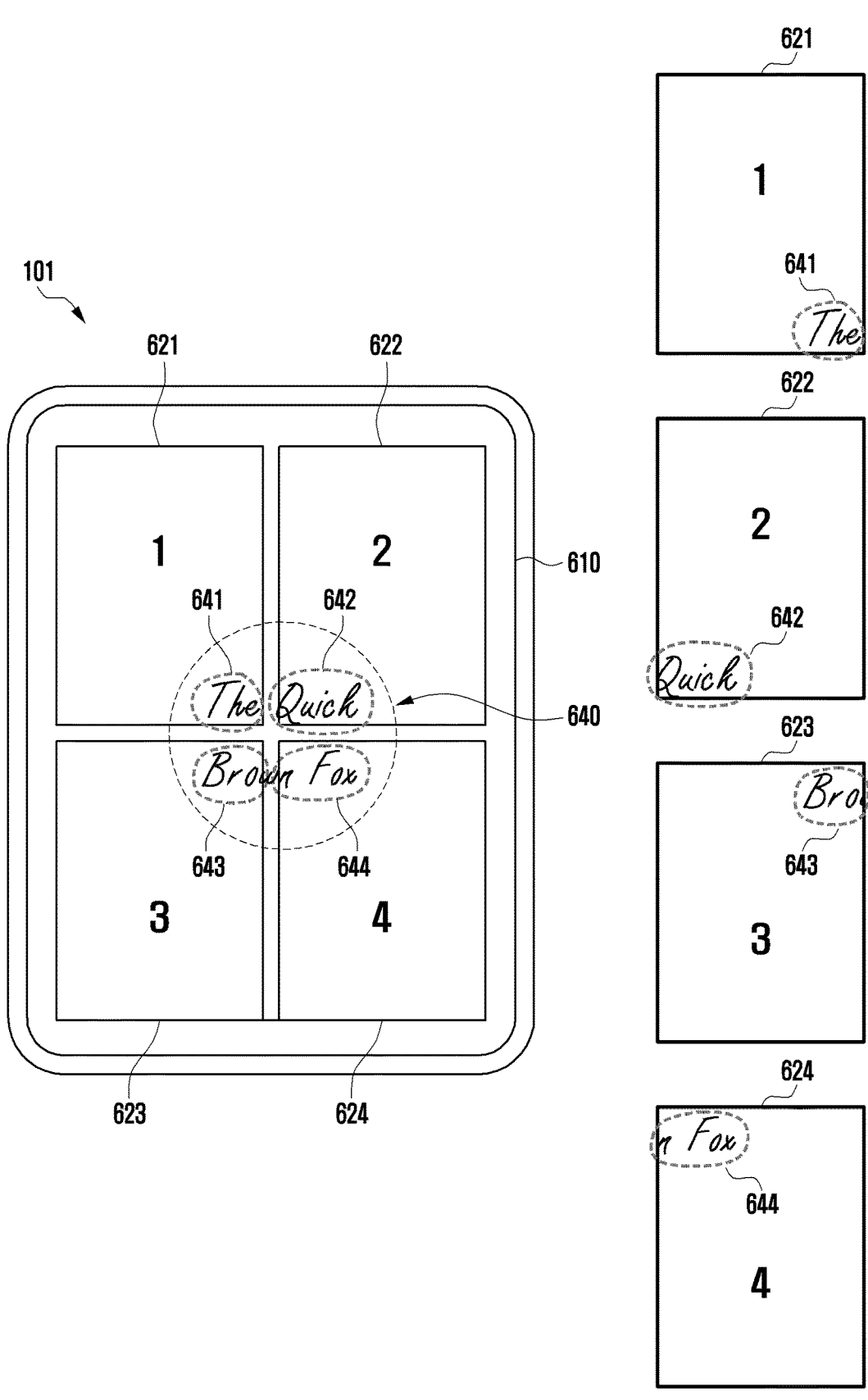
Figure 6C:
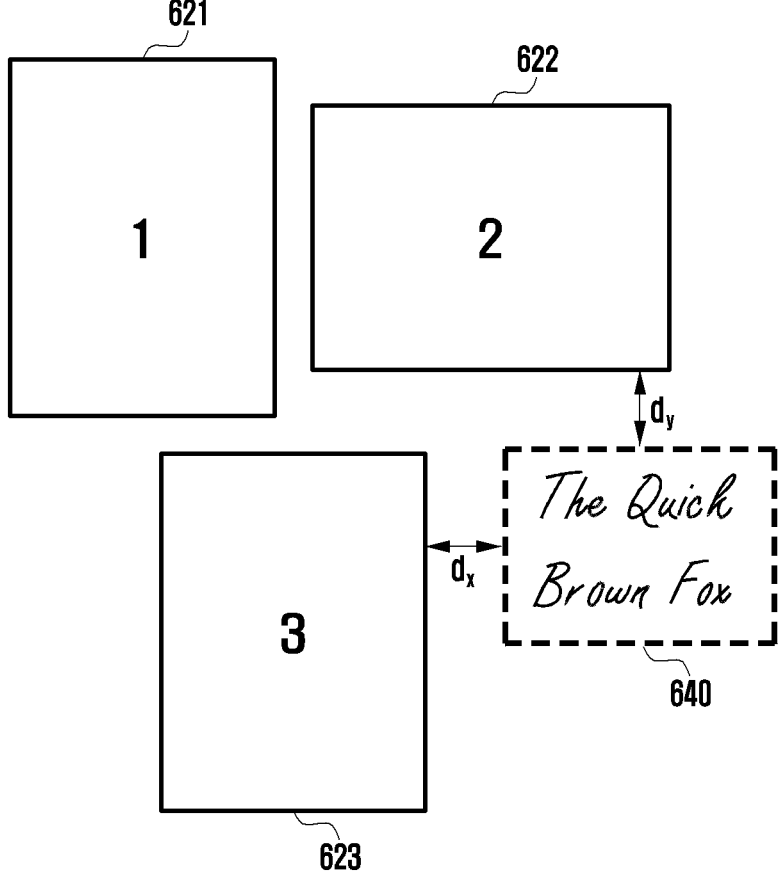

FIGS. 6A, 6B, and 6C illustrate a method in which an electronic device edits content including a plurality of pages according to various embodiments of the disclosure.

Referring to FIGS. 6A, 6B, and 6C, the electronic device 101 may display a plurality of pages (e.g., first page 621, second page 622, third page 623, and fourth page 624) in an editing area 610. The content may be document type content. The content may include at least one object (e.g., first object 640) on a plurality of pages 621, 622, 623, and 624. The at least one object (e.g., first object 640) may include any one of a text, an image, a table, and a handwriting object. The at least one object may be separated into one or more minimum units. The minimum unit may be determined in accordance with the object type. For example, if the object type is the handwriting object, the minimum unit may be a single stroke.

The electronic device 101 may determine whether the plurality of pages 621, 622, 623, and 624 are included in the editing area 610. The editing area 610 may mean an area for receiving the user input in order to generate or edit the content. The pages 621, 622, 623, and 624 included in the content may be displayed in the editing area 610. The electronic device 101 may determine whether the plurality of pages are simultaneously displayed in the editing area 610 based on the number of pages being displayed at once in the editing area 610. The editing area 610 may display an area 630 including at least a part of the whole content area, and the electronic device 101 may generate and/or change the at least one object 640 in the displayed editing area 610 through reception of the user input.

If the plurality of pages 621, 622, 623, and 624 are simultaneously displayed in the editing area 610, the electronic device 101 may simultaneously apply the at least one object 640 being generated or changed based on the user input to the plurality of pages 621, 622, 623, and 624 being simultaneously displayed. The simultaneous applying may be understood as handling of the plurality of pages included in the editing area 610 as the whole area that can be edited at once. In the editing area 610, one or more objects may be generated, disposed, and/or changed (hereinafter, edited) across the page boundary regardless of the separation of the plurality of pages. For example, with referring to FIG. 6A, if the first object 640 is generated across the first page 621, the second page 622, the third page 623, and the fourth page 624 being simultaneously displayed in the editing area 610, the first object 640 may be simultaneously applied onto the first page 621, the second page 622, the third page 623, and the fourth page 624.

Referring to FIG. 6B, when the editing of one or more objects 640 is completed, the edited object may be separated into minimum units (first unit object 641, second unit object 642, third unit object 643, and fourth unit object 644). The at least one object may be separated into one or more minimum units. The minimum unit may be determined depending on the object type. For example, if the object type is the handwriting object, the minimum unit may be a single stroke, and if the object type is the text, the minimum unit may be a single text letter. If the object type is the table, the minimum unit may be a single cell, and if the object type is the image, the minimum unit may be a single image. The electronic device 101 may separate the editing-completed object into the minimum units based on the object type. With reference to FIG. 6B, the separated minimum units (the first unit object 641, second unit object 642, third unit object 643, and fourth unit object 644) may be separated based on the single stroke.

The electronic device 101 may store the respective separated minimum units so as to be included on the corresponding pages. In the electronic device 101, the page corresponding to the minimum unit may be determined based on the disposition location when the editing of the minimum units is completed. If one minimum unit (the first unit object 641, second unit object 642, third unit object 643, or fourth unit object 644) is disposed across the plurality of pages, a partial area of the minimum unit may become the basis of the disposition location. For example, in case of the handwriting object, if one stroke is disposed across the first page and the second page, the location of the corresponding minimum unit may be determined based on the area in which the stroke starts. The electronic device 101 may separately dispose and store the separated minimum units on the corresponding pages, respectively. With reference to FIG. 6B, the first unit object 641 may be included and stored on the first page 621 being the corresponding page, and the second unit object 642 may be included and stored on the first page 621 being the corresponding page. The third unit object 643 may be included and stored on the first page 621 being the corresponding page, and the fourth unit object 644 may be included and stored on the first page 621 being the corresponding page.

Referring to FIG. 6C, if the location in which the first object 640 is disposed does not belong to any page, for example, if a blank area where the page is not present is located in the editing area 610, the electronic device 101 may include and store the first object 640 in the closest page among the plurality of pages. For example, with reference to FIG. 6C, if the first object 640 does not belong to any one of the plurality of pages (e.g., the first page 621, the second page 622, the third page 623, and the fourth page 624), and is located in the blank, the electronic device 101 may identify the shortest distance (e.g., dx and dy) between the respective pages (e.g., the second page 622 and the third page 623) of the first object 640, and may include and store the first object 640 on the page (e.g., the second page 622) having the closest shortest distance (e.g., dy).

Figure 7:
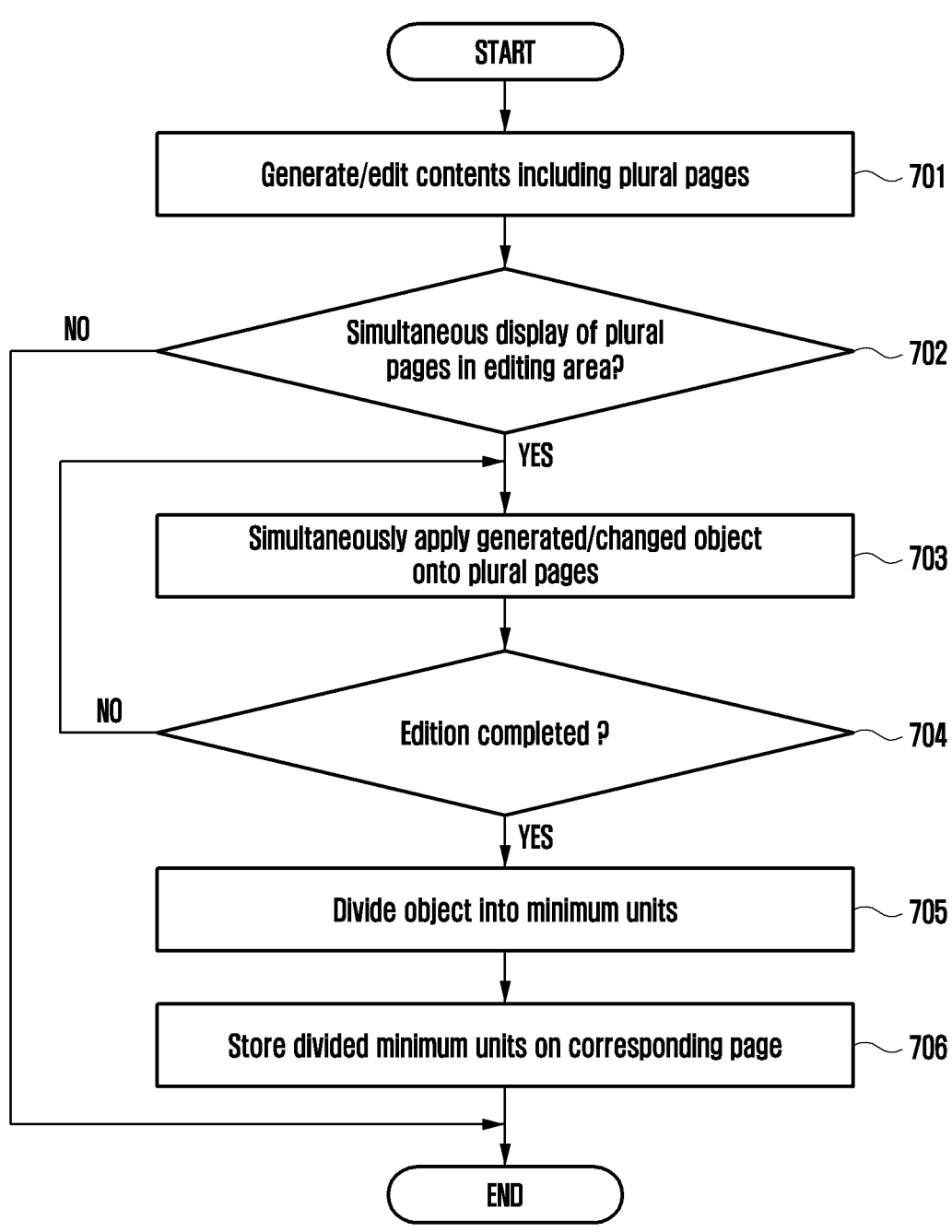
FIG. 7 is a flowchart illustrating an operation in which an electronic device edits content including a plurality of pages according to an embodiment of the disclosure.

FIG. 7 is a flowchart illustrating an operation in which an electronic device edits content including a plurality of pages according to an embodiment of the disclosure.

Referring to FIG. 7, a series of operations in which the electronic device (e.g., electronic device 101 of FIG. 1 or electronic device 101 of FIG. 5) edits content including a plurality of pages may be explained as operations being performed by the processor (e.g., processor 120 of FIG. 1 or processor 120 of FIG. 5) of the electronic device. Parts of the operations of FIG. 7 may be changed or replaced by replaceable operations, or the order thereof may be changed.

In operation 701, the processor 120 may generate or edit the content. The content may be multimedia content including one or more pages. The one or more pages may mean partitions for visually separating the contents of the content. The content may be document type content. The content may include at least one object on the page. The at least one object may include any one of the text, image, table, handwriting object, audio, web page, and portable document format (PDF). The at least one object may be separated into one or more minimum units. The minimum unit may be determined depending on the type of the object. For example, if the object type is the handwriting object, the minimum unit may be a single stroke, and if the object type is the text, the minimum unit may be a single text letter. If the object type is the table, the minimum unit may be a single cell, and if the object type is the image, the minimum unit may be a single image. The processor 120 may receive the user input, and may generate and/or change the one or more objects based on the user input. The processor 120 may receive the user input through the display module (e.g., display module 160 of FIG. 5), an electronic pen, and an input module (e.g., input module 150 of FIG. 1).

In operation 702, the processor 120 may determine whether a plurality of pages are simultaneously displayed in an editing area. The editing area may mean an area for receiving the user input in order to generate or edit the content. The pages included in the content may be displayed in the editing area. The processor 120 may determine whether the plurality of pages are simultaneously displayed in the editing area based on the number of pages being displayed at once in the editing area. The editing area may display an area including at least a part of the whole content area, and the processor 120 may generate and/or change the at least one object in the displayed editing area through reception of the user input.

In operation 703, if the plurality of pages are simultaneously displayed in the editing area, the processor 120 may simultaneously apply the at least one object being generated or changed based on the user input to the plurality of pages being simultaneously displayed. The simultaneous applying may be understood as handling of the plurality of pages included in the editing area as the whole area that can be edited at once. In the editing area, one or more objects may be generated, disposed, and/or changed (hereinafter, edited) across a page boundary regardless of the separation of the plurality of pages. For example, if the first object is generated across the first page and the second page being simultaneously displayed in the editing area, the first object may be simultaneously applied onto the first page and the second page.

In operation 704 and operation 705, if editing of one or more objects is completed, the edited object may be separated into the minimum units. The at least one object may be separated into one or more minimum units. The minimum unit may be determined depending on the type of the object. For example, if the object type is the handwriting object, the minimum unit may be a single stroke, and if the object type is the text, the minimum unit may be a single text letter. If the object type is the table, the minimum unit may be a single cell, and if the object type is the image, the minimum unit may be a single image. According to an embodiment, the processor 120 may separate the editing-completed object into the minimum units based on the object type.

In operation 706, the processor 120 may store the respective separated minimum units so as to be included on the corresponding pages. The page corresponding to the minimum unit may be determined based on the disposition location when the editing of the minimum units is completed. If one minimum unit is disposed across the plurality of pages, a partial area of the minimum unit may become the basis of the disposition location. For example, in case of the handwriting object, if one stroke is disposed across the first page and the second page, the location of the corresponding minimum unit may be determined based on the area in which the stroke starts. The processor 120 may separately dispose and store the separated minimum units on the corresponding pages, respectively. If the location in which the minimum unit is disposed does not belong to any page, for example, if the minimum unit is located in a blank area where the page is not present in the editing area, the processor 120 may include and store the minimum unit in the closest page among the plurality of pages.

Figure 8A:
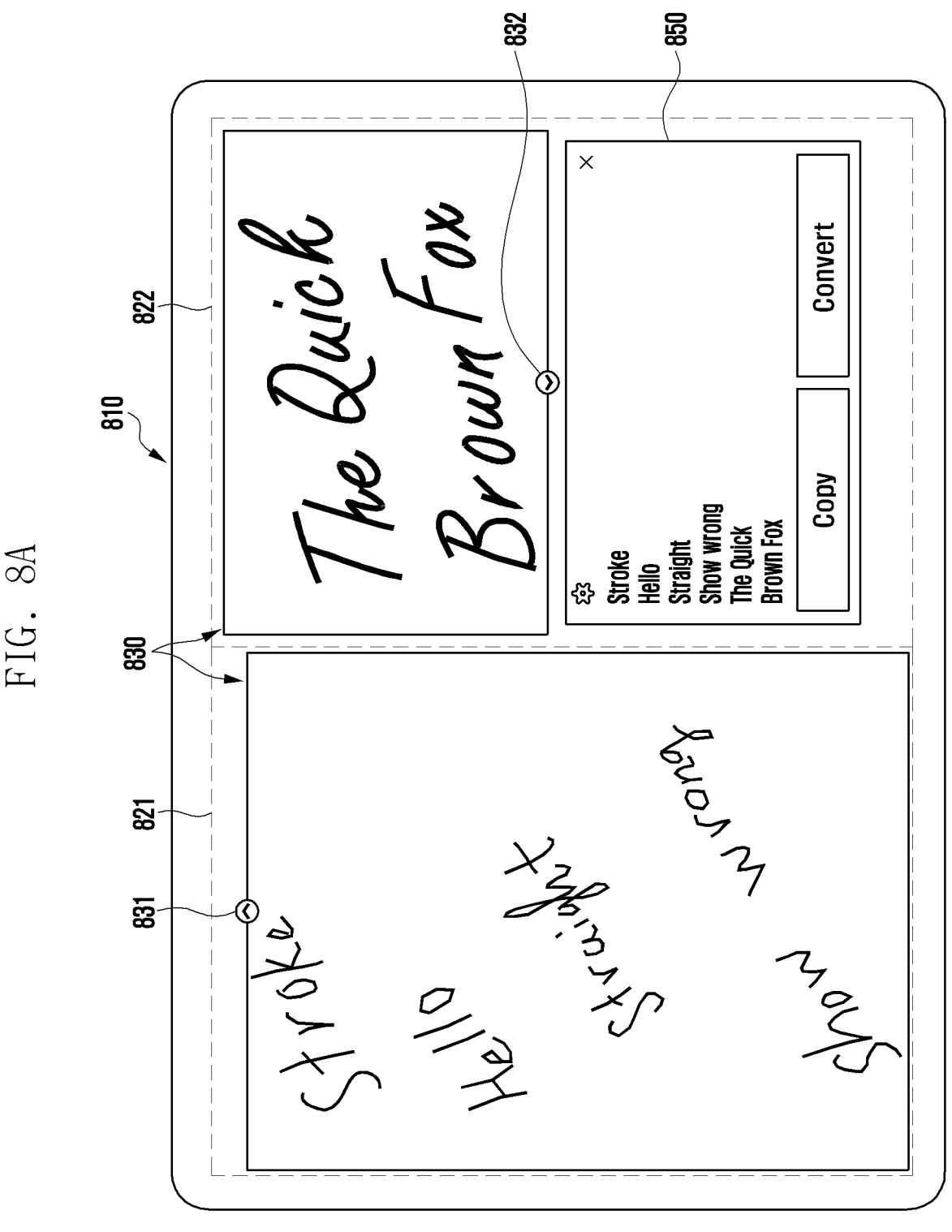
FIGS. 8A, 8B, and 8C explain a method in which an electronic device edits content including a handwriting object according to various embodiments of the disclosure.
Figure 8B:
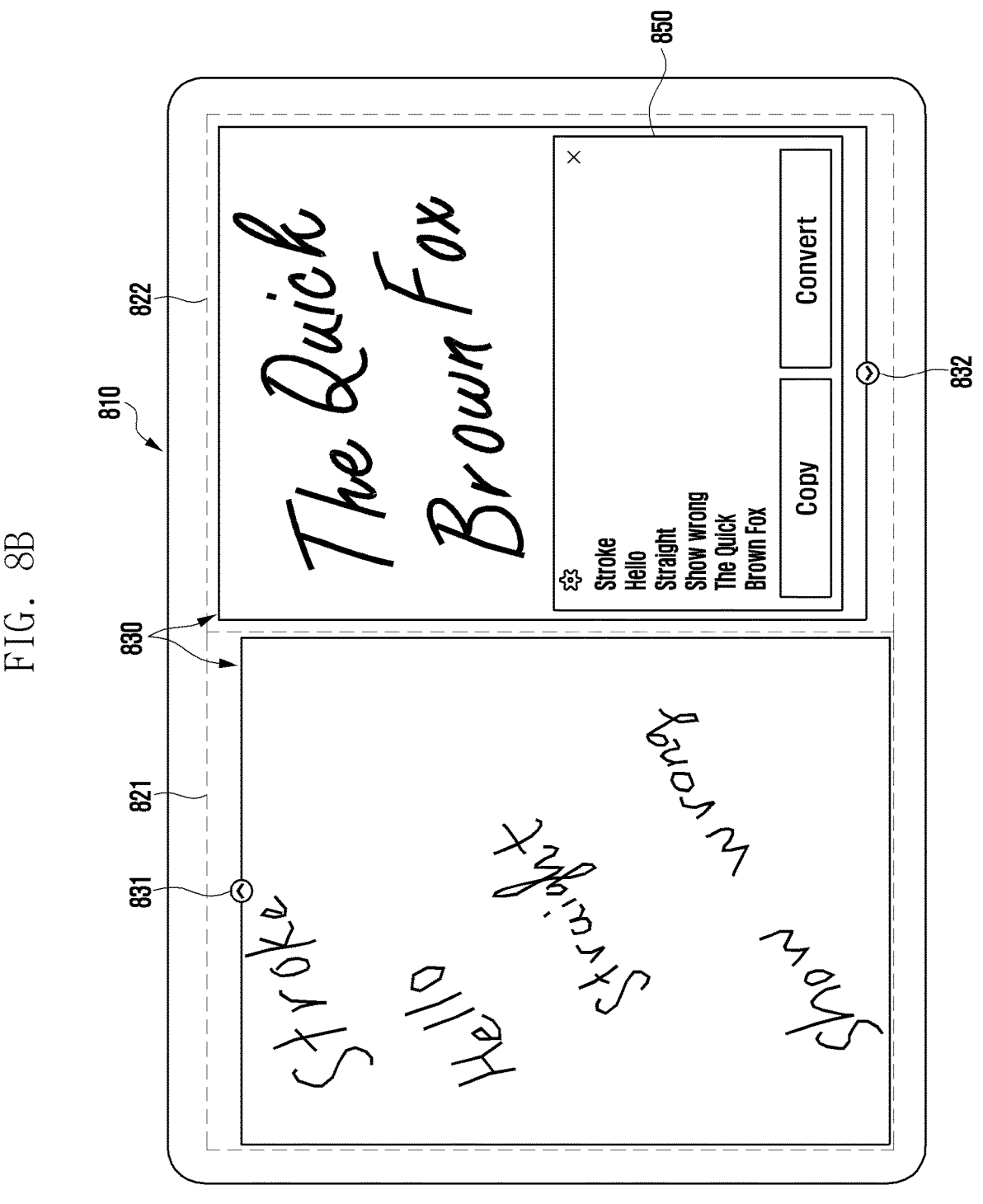
Figure 8C:
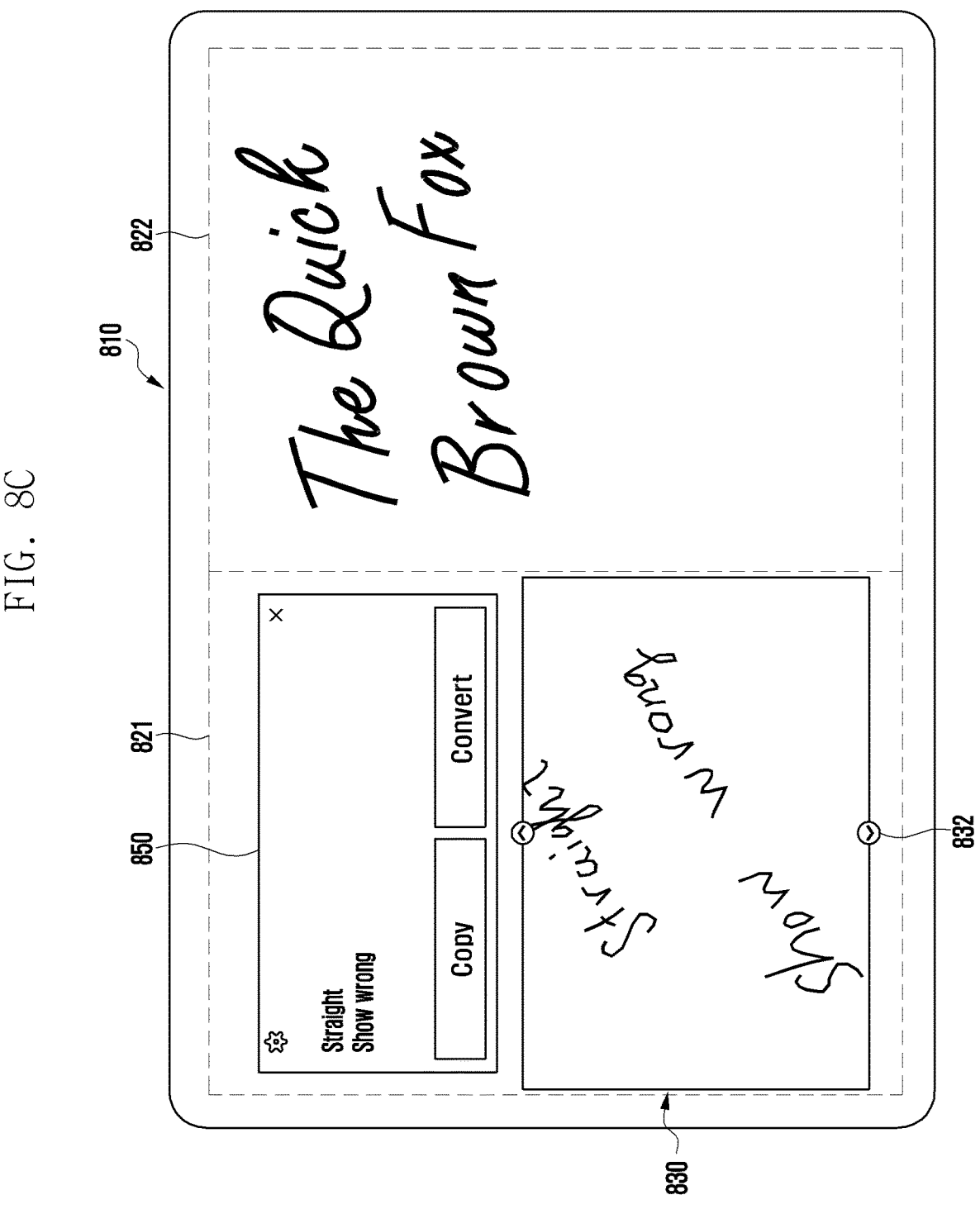

FIGS. 8A, 8B, and 8C explain a method in which an electronic device edits content including a handwriting object according to various embodiments of the disclosure.

Referring to FIGS. 8A, 8B, and 8C, the electronic device (e.g., electronic device 101 of FIG. 1 or electronic device 101 of FIG. 5) may display a selection area 830 in an editing area 810. The selection area 830 may mean an area for selecting the whole or partial area among the one or more objects being displayed. For example, the selection area 830 may be a partial area being selected in order to edit a specific object in the editing area 810. The selection area 830 may include at least one GUI 831 and 832 for adjusting the size thereof. The selection area 830 may be an area for selecting at least a part of a handwriting object 840.

Referring to FIGS. 8A, 8B, and 8C, the electronic device 101 may display a preview area 850. The preview area 850 may be an area for displaying in advance the result of text recognition of the handwriting object 840 included in the selection area 830. The text recognition may mean recognition and conversion of the handwriting object 840 into a corresponding digital text. The electronic device 101 may recognize the handwriting object 840 included in the selection area 830, and may display the recognized digital text on the preview area 850. The electronic device 101 may generate a new text object by transferring the digital text displayed on the preview area 850 to the page in the editing area 810, or may copy and temporarily store the digital text in the memory 130.

Referring to FIGS. 8A, 8B, and 8C, the electronic device 101 may change the location of the preview area 850 based on the selection area 830. The user may intend to use a function related to the handwriting object 840, such as text recognition of the handwriting object 840, based on the selection area 830, and in consideration of the user convenience, it may be preferable to minimize an area in which the preview area 850 and the selection area 830 overlap each other. Further, it may be preferable to dispose the preview area 850 and the selection area 830 in a close distance so as to facilitate the work at a glance. The electronic device 101 may dispose the preview area 850 at a location where an overlapping area of the preview area 850 and the selection area 830 becomes minimized based on the location of the selection area 830. The electronic device 101 may dispose the preview area 850 at the location closest to the selection area 830 in the editing area 810. According to an embodiment, the electronic device 101 may determine the location of the preview area 850 based on the location of the graphic user interface for adjusting the size and/or the location of the selection area 830.

Referring to FIG. 8A, since a part excluding the selection area 830 is a lower-end partial area of the second page 822 based on the respective locations of the graphic user interfaces 831 and 832, the preview area 850 may be disposed at a lower end part of the second graphic user interface 832.

Referring to FIG. 8B, since the whole area of the first page 821 and the second page 822 corresponds to the selection area 830, the selection area 830 and the preview area 850 have no choice but to overlap each other, and efficient disposition may be provided by disposing the preview area 850 at the lower end part adjacent to the first graphic user interface 831 or by disposing the preview area 850 at an upper end part adjacent to the second graphic user interface 832.

Referring to FIG. 8C, since the part excluding the selection area 830 corresponds to the upper end partial area of the first page 821 and the whole area of the second page 822, but the selection area 830 crosses only the first page 821, the preview area 850 may be disposed at the upper end part adjacent to the first graphic user interface 831.

Figure 9:
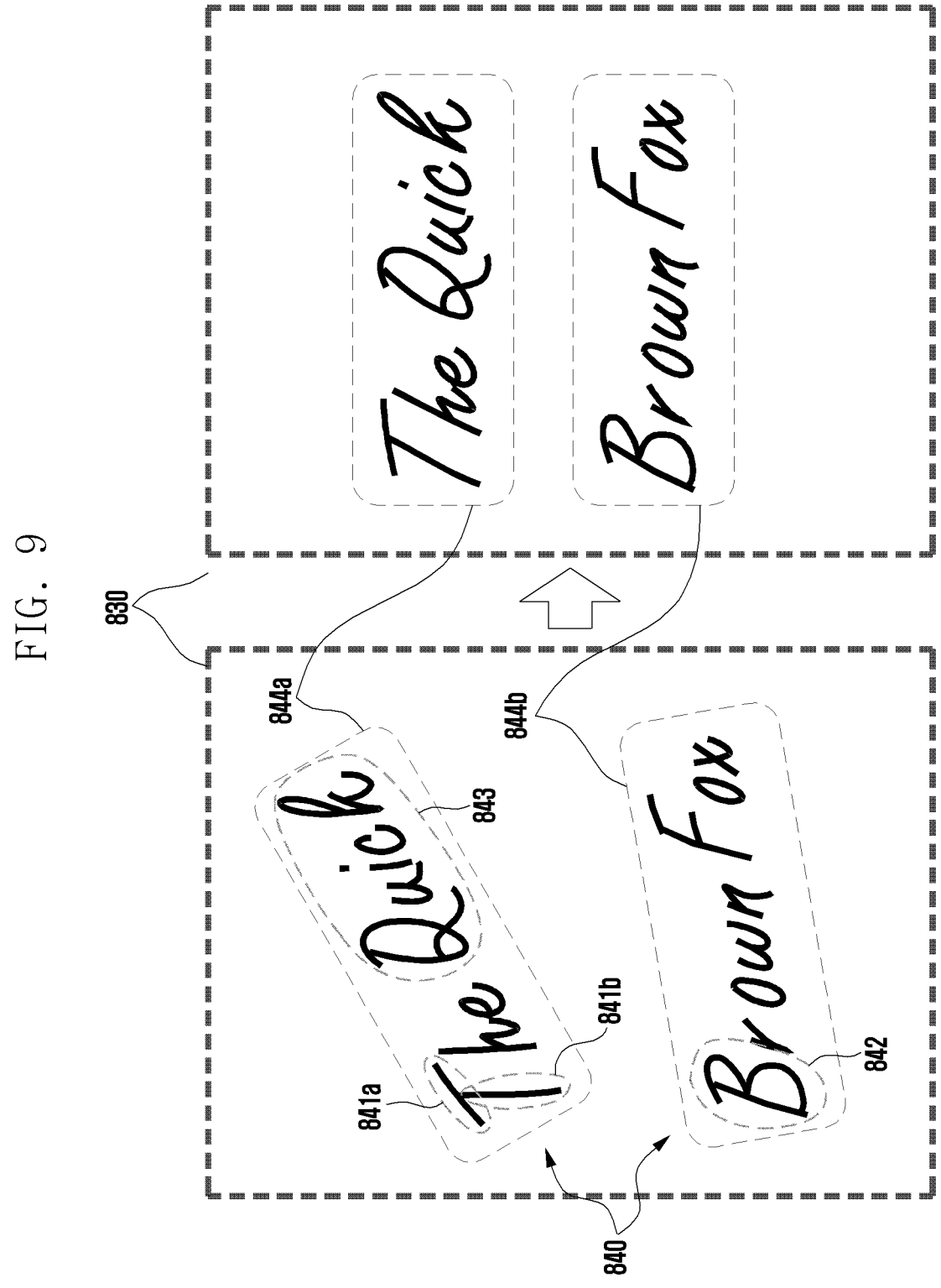
FIG. 9 illustrates a method in which an electronic device arranges a handwriting object according to an embodiment of the disclosure.

FIG. 9 illustrates a method in which an electronic device arranges a handwriting object according to an embodiment of the disclosure.

Referring to FIG. 9, the electronic device 101 may arrange the handwriting object 840. The electronic device 101 may separate the handwriting object 840 into one or more lines 844a and 844b. The handwriting object 840 may include a plurality of strokes 841a and 841b, and the electronic device 101 may separate the handwriting object 840 into one or more letters 842 or one or more lines 844a and 844b based on the locations of the plurality of strokes. The electronic device 101 may separate the handwriting object 840 into one or more words 843 based on the locations of the plurality of strokes. According to an embodiment, the electronic device 101 may arrange the handwriting object 840 based on the locations of the separated letters 842 and/or lines 844a and 844b. For example, the electronic device 101 may arrange the handwriting object 840 so that the handwriting object 840 is rotated and/or moved in the unit of the separated letters 842 and/or lines 844a and 844b by changing the locations of the plurality of strokes based on the separated letters 842 and/or lines 844*a* and 844*b*.

Figure 10:
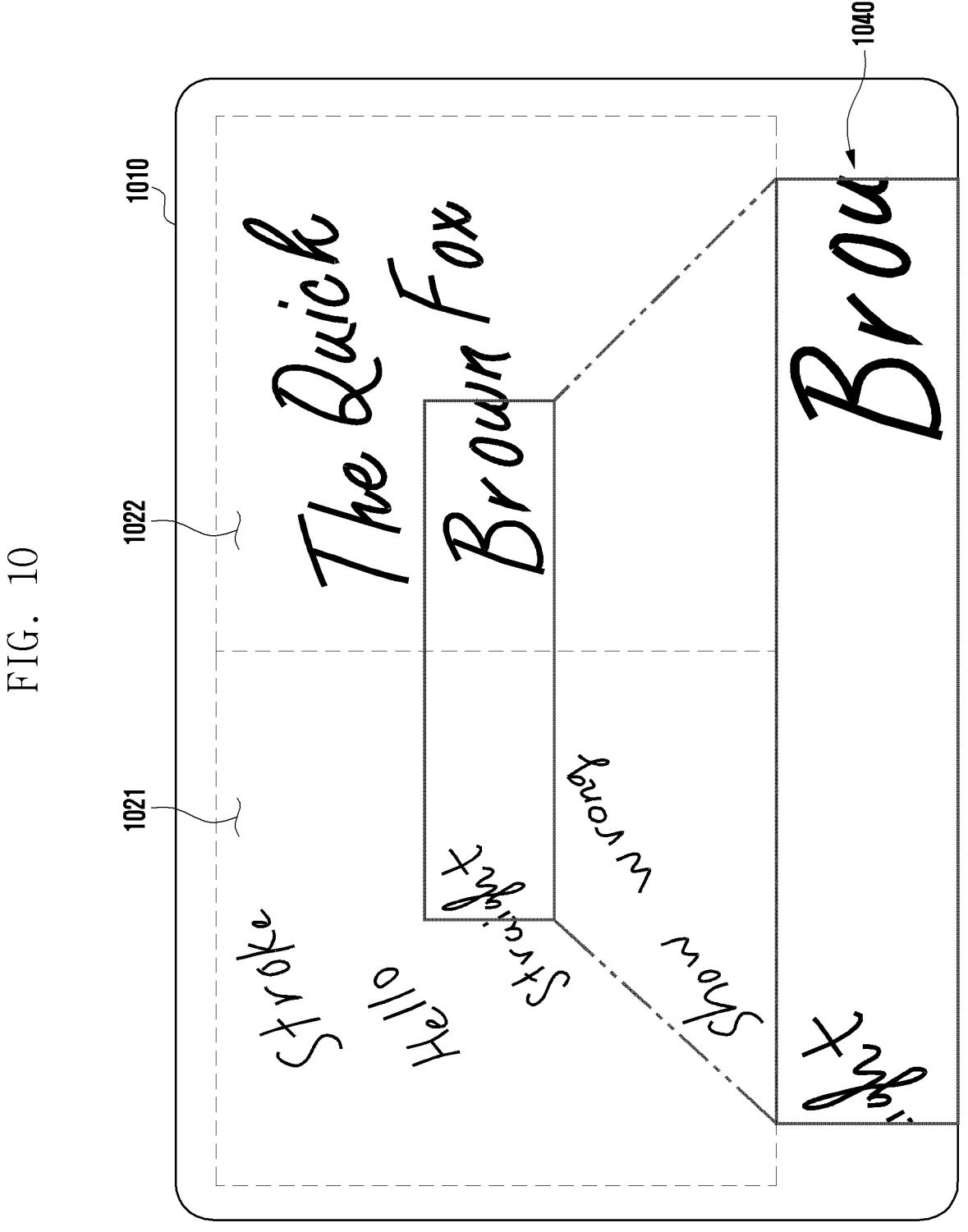
FIG. 10 illustrates a zoom area being provided by an electronic device according to an embodiment of the disclosure.

FIG. 10 illustrates a zoom area being provided by an electronic device according to an embodiment of the disclosure.

Referring to FIG. 10, the electronic device (e.g., electronic device 101 of FIG. 1 or electronic device 101 of FIG. 5) may display a zoom area 1040 in an editing area 1010. According to an embodiment, the zoom area 104 may be an area in which at least a partial area of the editing area is enlarged and displayed. The electronic device 101 may enlarge and display an area included in a selection area in the zoom area 1040. The electronic device 101 may receive a user input through the zoom area 1040, and may display the input result on a corresponding part in the selection area based on the received input.

Referring to FIG. 10, in case that the selection area is located across the plurality of pages (e.g., first page 1021 and second page 1022), the zoom area 1040 may be simultaneously enlarged and displayed on a plurality of page areas. The electronic device 101 may dispose the selection area across the plurality of pages based on the configuration according to the user input, or may move the selection area into the inside of one page so that the selection area does not extend between the pages in case that the selection area 1030 is disposed across the plurality of pages.

Figure 11A:
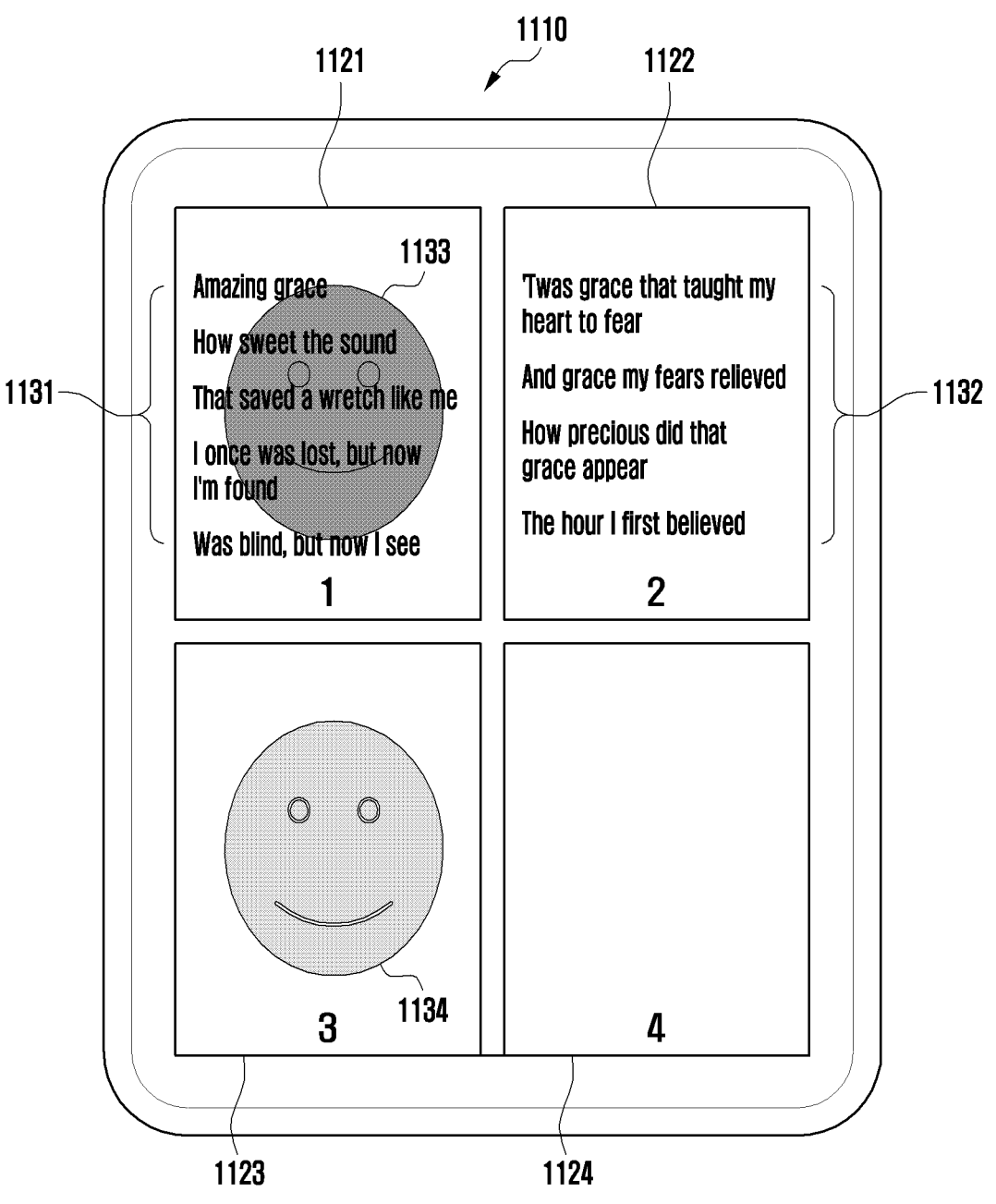
FIGS. 11A and 11B explain a background text function being provided by an electronic device according to various embodiments of the disclosure.
Figure 11B:
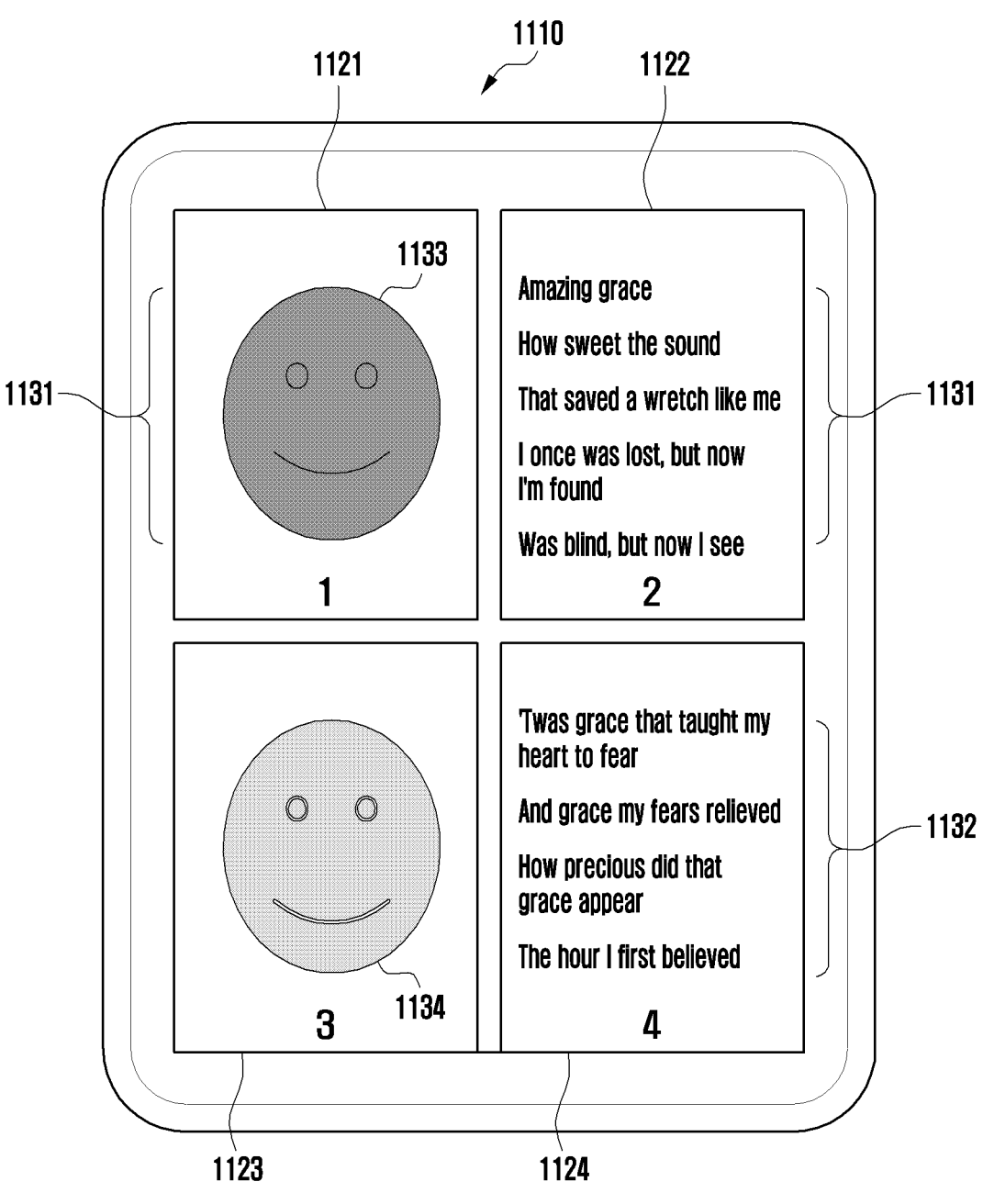

FIGS. 11A and 11B explain a background text function being provided by an electronic device according to various embodiments of the disclosure.

Referring to FIGS. 11A and 11B, the electronic device 101 may separately configure a part in which editing of a background text is possible among the plurality of pages. The background text editing may mean the content editing through an input of text objects (e.g., first text object 1131 and second text object 1132). The electronic device 101 may receive an input for separately configuring the page on which the background text editing is possible or the page on which the background text editing is not possible among the plurality of pages.

Referring to FIG. 11A, an embodiment in which a page 1110 on which the background text editing is possible is not configured is illustrated. In this case, the electronic device 101 having received the text input may sequentially dispose and display the text objects (e.g., first text object 1131 and second text object 1132) from the first page 1121 to the second page 1122. In this case, a first image object 1133 and a second image object 1134 located on the first page 1121 and the third page 1123 may overlap the text objects (e.g., first text object 1131 and second text object 1132).

Referring to FIG. 11B, an embodiment in which a page on which the background text editing is possible is configured is illustrated. For example, FIG. 1/B illustrates an embodiment in which the first page 1121 and the third page 1123 may be configured so that the background text editing is not possible. In this case, the electronic device 101 having received the text input may sequentially dispose and display the text objects (e.g., first text object 1131 and second text object 1132) from the second page 1122 to the fourth page 1124, excluding the first page 1121 and the third page 1123. In this case, the first image object 1133 and the second image object 1134 located on the first page 1121 and the third page 1123 may not overlap the text objects (e.g., first text object 1131 and second text object 1132). Accordingly, the electronic device 101 may simultaneously display the plurality of pages 1121, 1122, 1123, and 1124, and thus can provide user convenience in a manner that the image objects (e.g., first image object 1133 and second image object 1134) are input onto the pages (e.g., first page 1121 and third page 1123) located on the left side, and the text objects corresponding to the respective image objects are separately input onto the right pages (e.g., second page 1122 and fourth page 1124).

Figure 12:
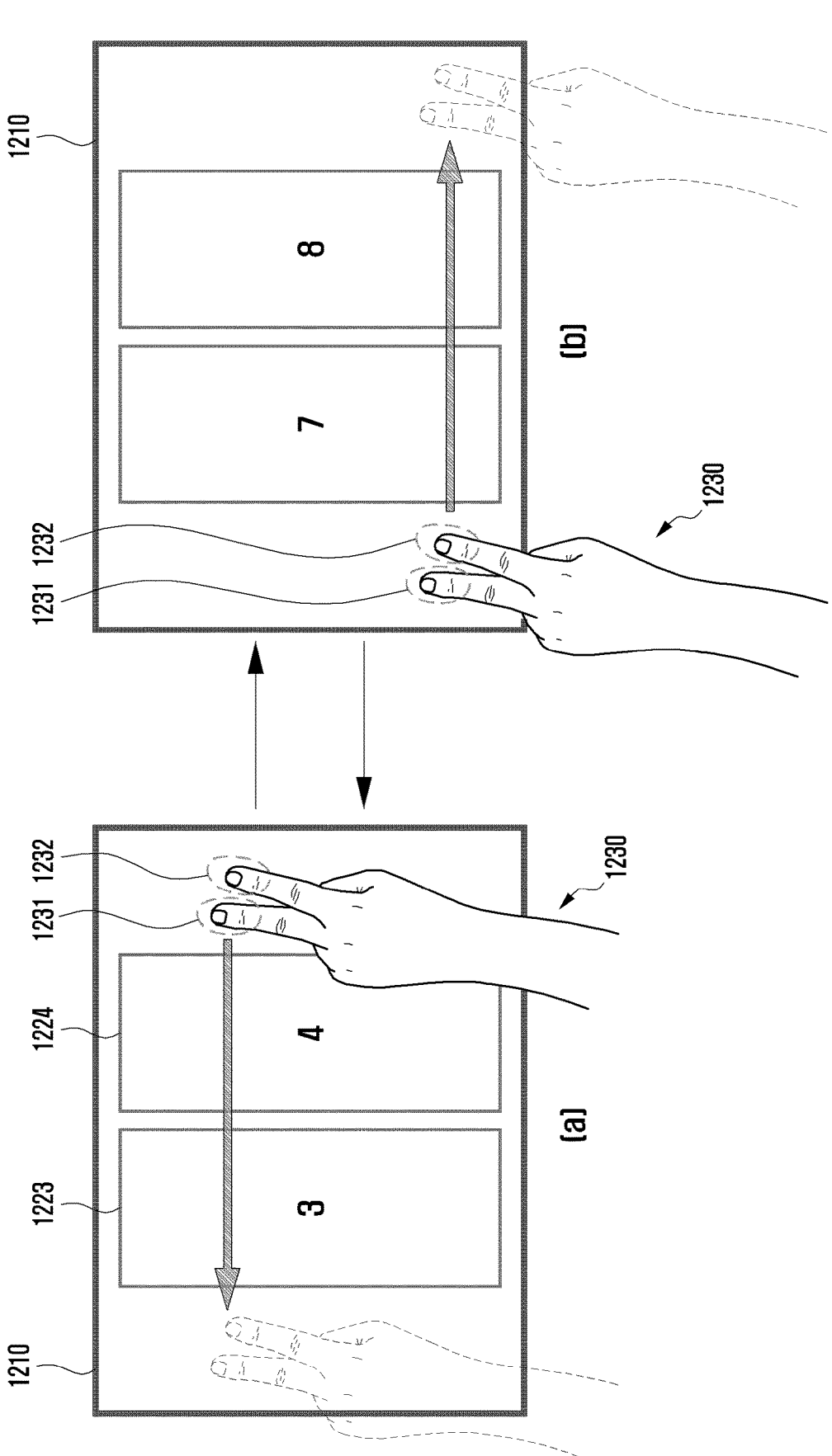
FIG. 12 illustrates a method in which an electronic device changes pages through recognition of a user's gesture according to an embodiment of the disclosure.

FIG. 12 illustrates a method in which an electronic device changes pages through recognition of a user's gesture according to an embodiment of the disclosure.

Referring to FIG. 12, the electronic device 101 may receive an input for moving a plurality of pages, and may move the plurality of pages based on the received input. The page movement may mean an operation of displaying other pages in the editing area. The electronic device 101 may move the pages through a gesture based on the touch input, such as swipe or fling. When receiving the gesture based on the touch input, the electronic device 101 may identify the number of fingers being simultaneously touched. The electronic device 101 may change the number of pages being moved at once based on the number of fingers being simultaneously touched. When receiving the touch input gesture, the electronic device 101 may move the pages based on the number of fingers being simultaneously touched and the gesture progress direction.

Referring to part (a) of FIG. 12, the electronic device 101 may receive touch inputs 1231 and 1232 from two fingers 1230 in the editing area 1210, and may receive a swipe gesture in the left direction. In this case, since the electronic device 101 simultaneously displays the two pages, the two pages may be handled as one group. In this case, based on the number of touch inputs, total four pages may be moved through movement of two page groups as shown in part (b) of FIG. 12. Further, with reference to part (b) of FIG. 12, if the electronic device 101 receives the swipe gesture in the right direction through reception of the touch input from the same number of fingers, the pages may return again as shown in part (a) of FIG. 12.

The electronic device 101 may move the pages based on a numeral input. For example, the electronic device 101 may move the pages by determining the number of pages moving at once based on the numeral input. The electronic device 101 may receive the numeral input from an external input device (e.g., keyboard), and may move the pages based on the received input. The electronic device 101 may display the moved pages in the editing area based on the user input. In case of simultaneously displaying the plurality of pages in the editing area, the electronic device 101 may fix a specific page, and may move only the remaining page excluding the fixed page when receiving the input for moving the page. For example, the electronic device 101 may fix only page 3 1223 as shown in part (a) of FIG. 12, and may move the remaining right area (e.g., page 4 1224). As an example, the electronic device 101 may receive the numeral input of 0 to 9 by using the external input device (e.g., keyboard). On the assumption that the page or the multi-page shown on one screen is one unit of the page group, each numeral may correspond to a relative location of the page group. In case of displaying two pages at a time, pages 1 and 2 may be group 1, and pages 3 and 4 may be group 2. On the assumption that the current location corresponds to page group 2 in a mode in which two pages are displayed at a time, if a numeral 1 button is pressed, page group 2 may move over to page group 3. If numeral key 5 is pressed on page group 2, it may be included that page group 2 may move over to page group 7 (pages 14 and 15). In this case, if it is desired to pass over the pages backward rather than forward, combination of two or more keys for an input excluding the numeral (e.g., shift button or control button)

and a numeral input may be utilized. If a shift key and a numeral key of 3 are pressed on page group 5 in a mode in which two pages are displayed at a time, the page group may move over to page group 2 (pages 3 and 4). In case that the electronic device 101 receives a specific input, such as a numeral key of 0, zoom magnification initialization or window fitting mode of the page group rather than the page group movement may be performed.

Figure 13:
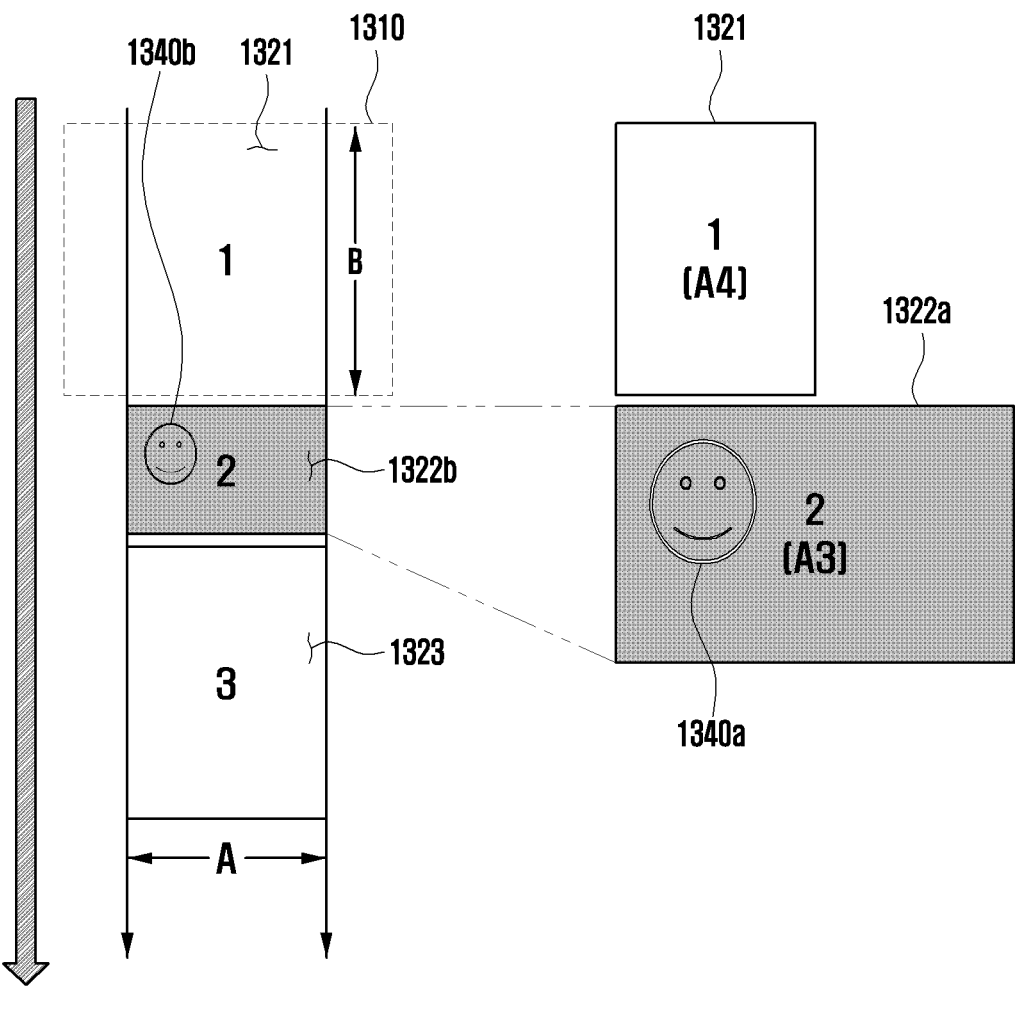
FIGS. 13 and 14 explain a method in which an electronic device displays a plurality of pages on a display according to various embodiments of the disclosure.
Figure 14:
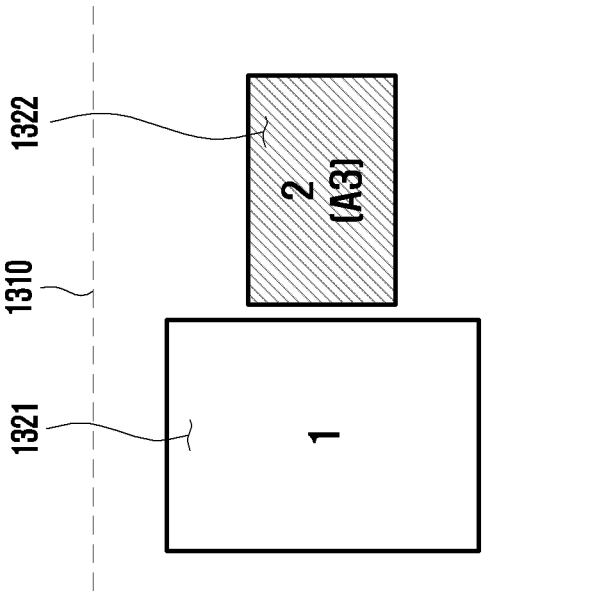
Figure 14:
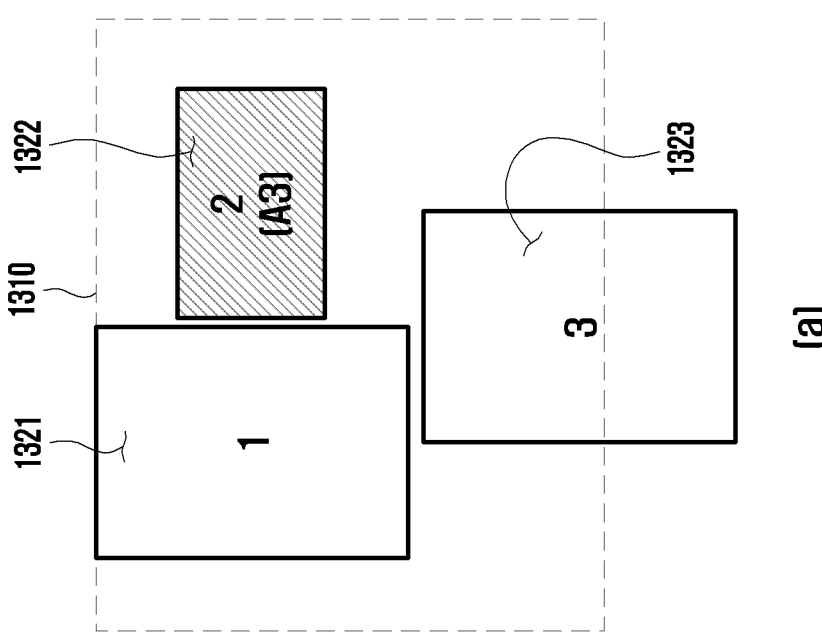

FIGS. 13 and 14 explain a method in which an electronic device displays a plurality of pages on a display according to various embodiments of the disclosure.

Referring to FIGS. 13 and 14, the electronic device 101 may configure reference paper information. The reference paper information may be information becoming the basis of the arrangement, location, direction, and/or magnification of pages. The reference paper information may be determined based on any one page (e.g., first page 1321) predetermined among the plurality of pages included in the content. For example, the reference paper information may include the size of the first page 1321 becoming the basis, direction (e.g., horizontal direction or vertical direction), scroll direction, and/or aspect ratio. The electronic device 101 may enlarge, reduce, and/or rotate the remaining page (e.g., second page 1322a) excluding the first page 1321 based on the reference paper information.

Referring to FIG. 13, in case that the scroll direction is configured as the vertical direction, based on the reference paper information (e.g., first page 1321), the electronic device 101 may enlarge or reduce all other pages (e.g., second page 1322a) so that the pages are displayed with the same horizontal length (length A) as the first page 1321 becoming the reference paper. In this case, the electronic device 101 may display the page (e.g., reduced second page 1322b) being enlarged or reduced as much as the magnification so that the page (e.g., second page 1322a) being enlarged or reduced has the same horizontal length as the first page 1321, and the object 1340a included in the page may also be displayed in an enlarged or reduced state (e.g., object 1340b) based on the same magnification. If the object included in the page (e.g., second page 1322a) being enlarged or reduced is the text, the text object included in the page may be displayed in the enlarged or reduced state based on the same magnification. For example, the text object being displayed with the same points on the first page 1321 and the second page 1322a may be displayed as being reduced in the same ratio as the reduction ratio of the reduced second page 1322b on the reduced second page 1322b.

Referring to FIG. 14, the electronic device 101 may dispose a plurality of pages based on the size of the editing area 1310.

Referring to parts (a) and (b) of FIG. 14, the electronic device 101 may horizontally dispose and simultaneously display the first page 1321 and the second page 1322 based on the size (e.g., horizontal length) of the editing area 1310. Further, with reference to part (a) of FIG. 14, in case that the scroll direction is vertical, a partial area of the third page 1323 may be displayed based on the vertical length of the editing area 1310. With reference to part (b) of FIG. 14, since the scroll direction is vertical, the electronic device 101 may not display the third page 1323 in the editing area 1310.

Figure 15:
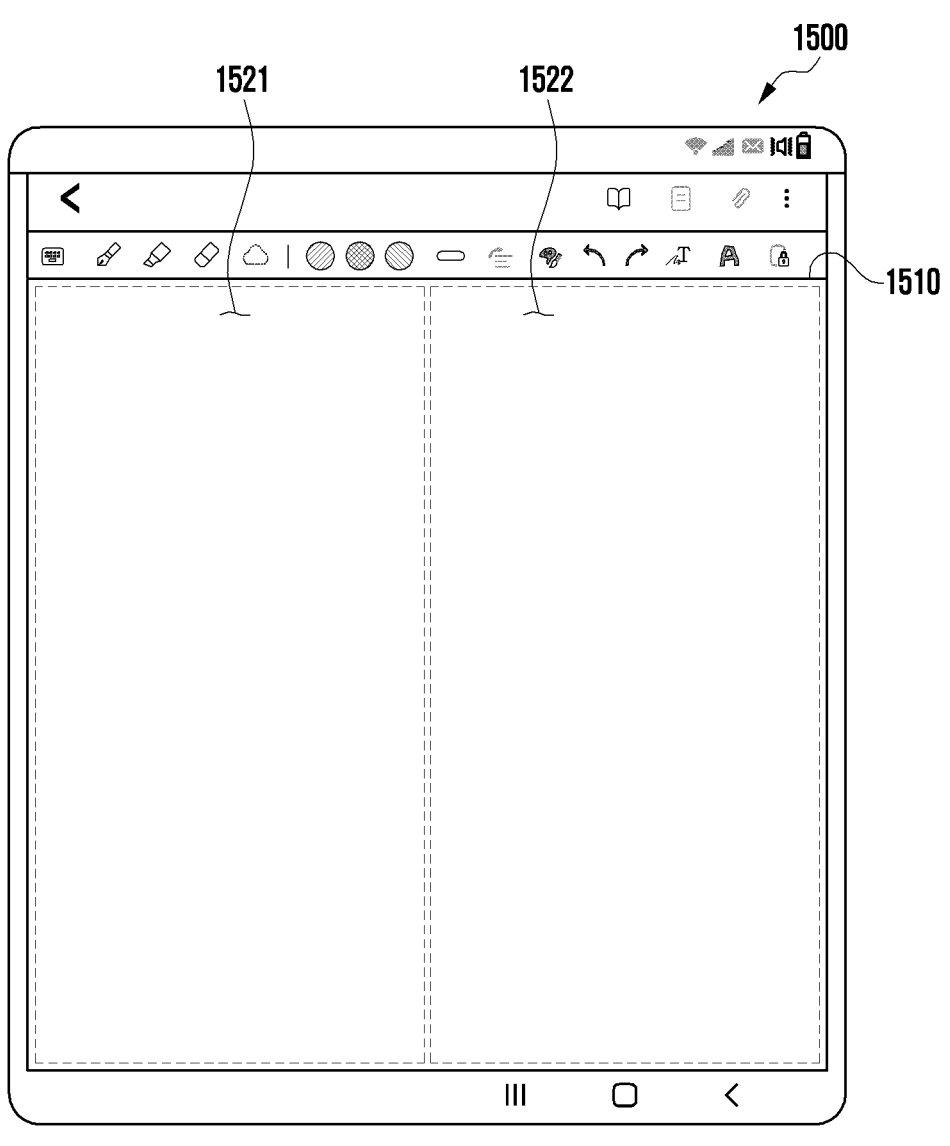
FIG. 15 illustrates an example of a page specification being provided by an electronic device according to an embodiment of the disclosure.

FIG. 15 illustrates an example of a page specification being provided by an electronic device according to an embodiment of the disclosure.

Referring to FIG. 15, the electronic device 101 may provide specifications of pages (e.g., first page 1521 and second page 1522) having the size corresponding to the area of a display 1500. As an example, the page having the size corresponding to the area of the display 1500 may be understood as a page including substantially the same size as the editing area 1510, for example, including a fitted page size and/or aspect ratio.

Referring to FIG. 15, the electronic device 101 may simultaneously display the first page 1521 and the second page 1522 having a size that substantially bisects the editing area 1510 on the editing area 1510.

Figure 16A:
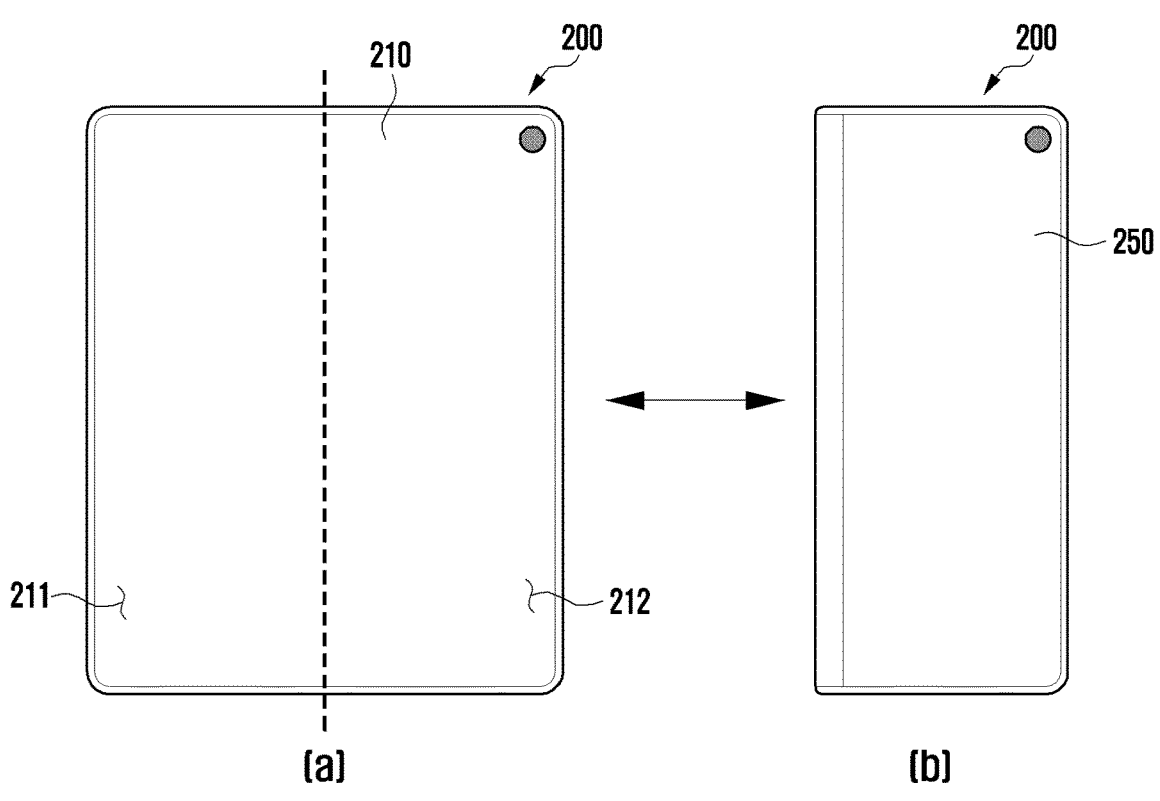
FIGS. 16A, 16B, and 16C explain a method in which an electronic device changes pages being displayed based on a display displaying content according to various embodiments of the disclosure.
Figure 16A:
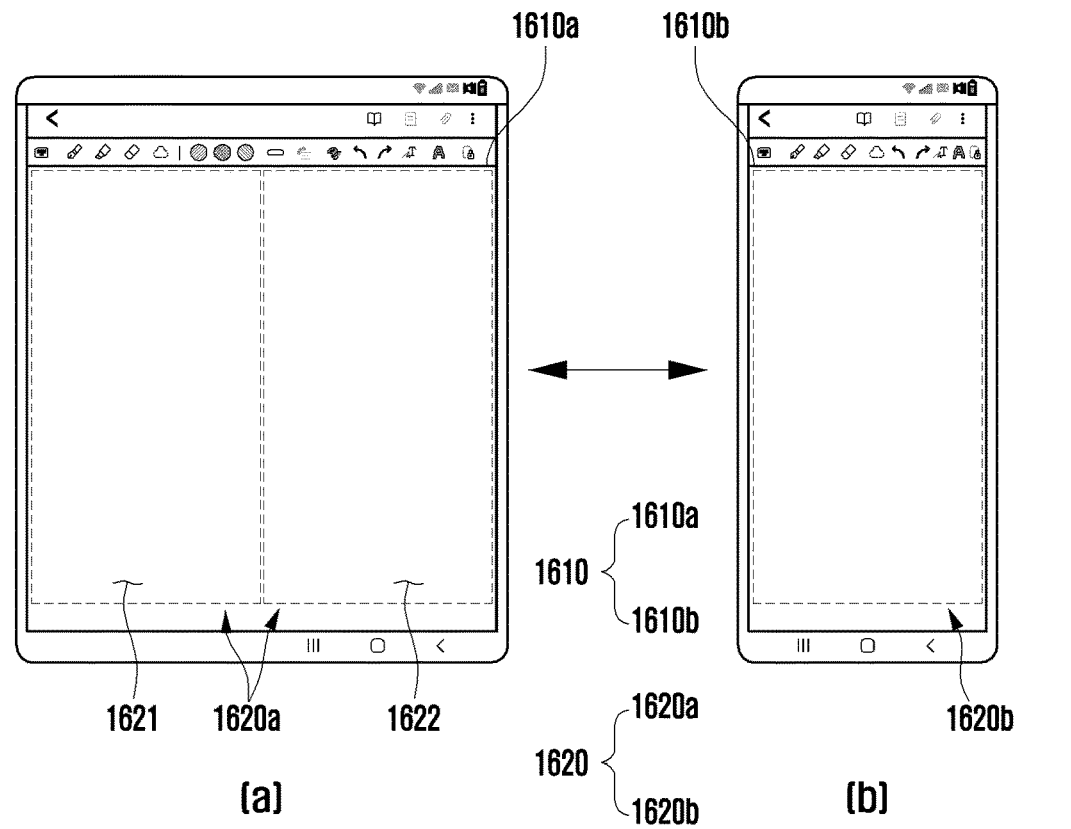
Figure 16B:
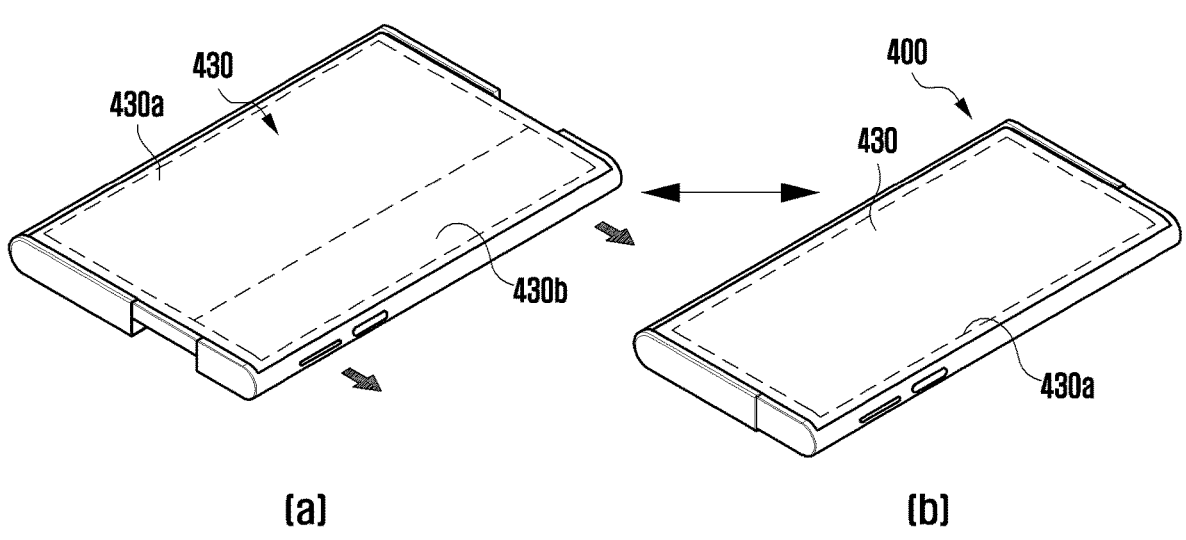
Figure 16B:
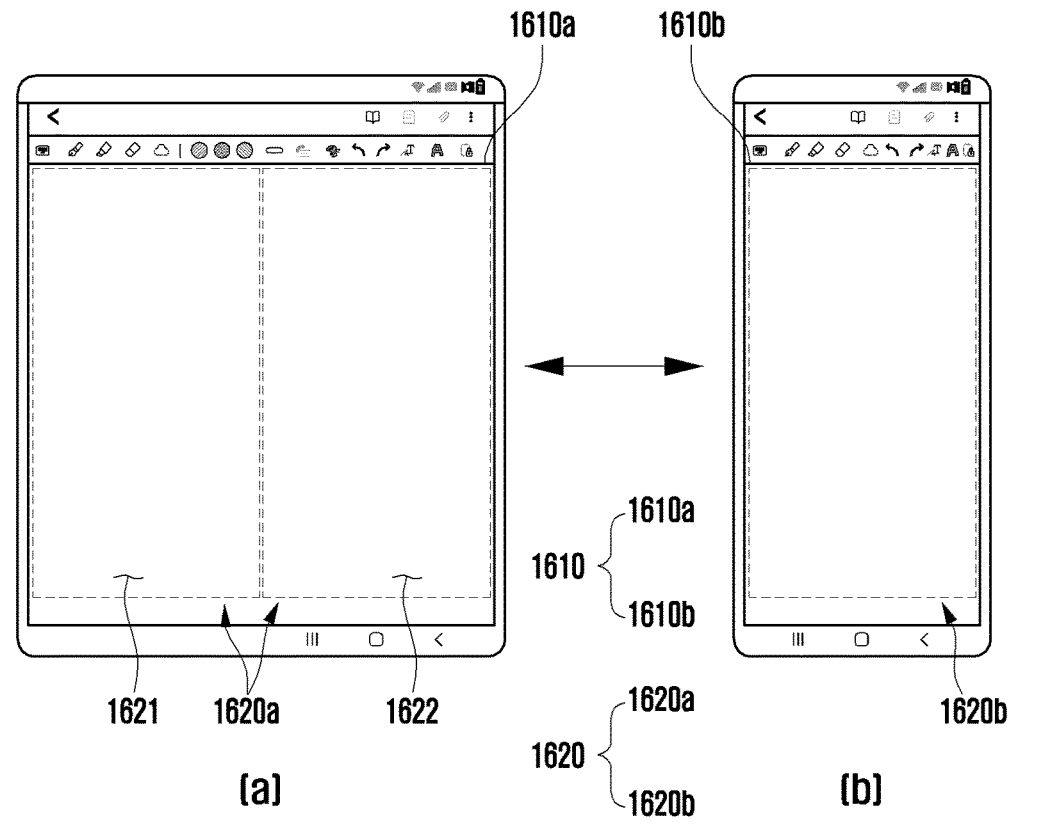
Figure 16C:
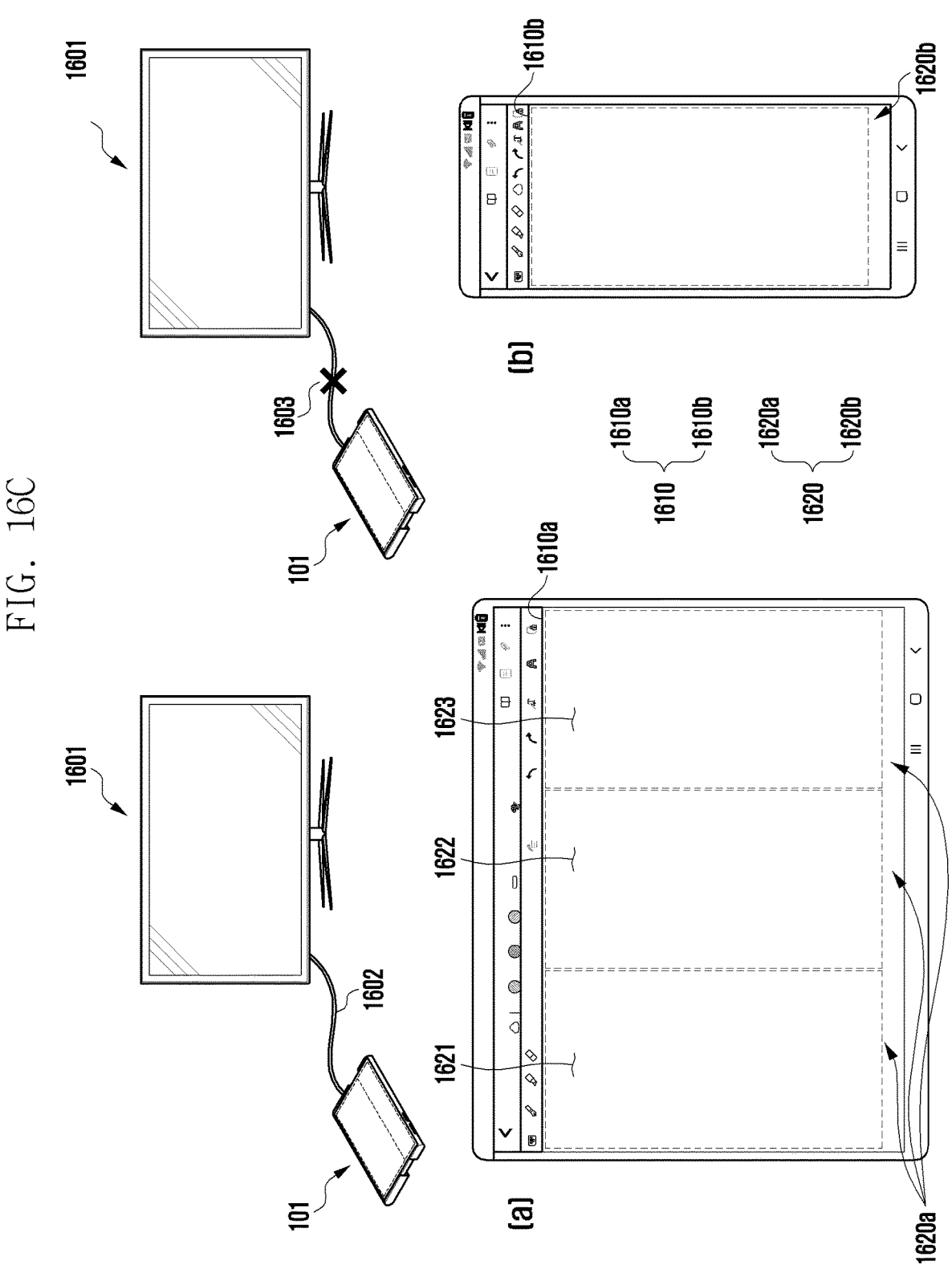

FIGS. 16A, 16B, and 16C explain a method in which an electronic device changes pages being displayed based on a display displaying content according to various embodiments of the disclosure.

Referring to FIGS. 16A, 16B, and 16C, the electronic device 101 may identify the display state. The electronic device 101 may have various shapes, for example, the shape of the foldable electronic device, such as the electronic device 200 of FIG. 2 or the electronic device 300 of FIG. 3 and the plurality of display panels 210 and 250, or may have the shape of the rollable electronic device, such as the electronic device 400 of FIG. 4. In this case, based on the shape of the housing of the electronic device, the shape of the flexible display may be transformed, and the areas being activated among the display areas or the displays being activated among the plurality of displays may differ from each other. The electronic device 101 may identify the state of the display, and may change the number of pages to be displayed in the editing area, the disposition of each page, or the direction of the page based on the size and/or the aspect ratio of the activated area in the display. The display state is not limited to the hardwired change of the display, but may differ based on the change of the display type, such as multi-window, popup window, or horizontal/vertical mode. Hereinafter, although FIGS. 16A, 16B, and 16C illustrate an example of displaying a determined number (e.g., one, two, or three) of pages in accordance with the display state of the electronic device 101, an example of the number of pages to be displayed based on the display state and/or the disposition is not limited thereto.

Referring to FIG. 16A, the electronic device 101 may include the shape of the foldable electronic device 200. Referring to part (a) of FIG. 16A, as the unfolded state of the flexible display, the display 210 may include a large-screen area including all of the first area 211 and the second area 212. In this case, the electronic device 101 may display all of a first page 1621 and a second page 1622 in an editing area 1610a based on the display state. Referring to part (b) of FIG. 16A, the display 210 is in a state where the flexible display is folded, and only the second display 250 is activated, and the first display 210 may be in a deactivated state. In this case, the electronic device 101 may reduce the editing area 1610a based on the display state, and may display only any one 1620b of the first page 1621 or the second page 1622 corresponding to the size of the reduced editing area 1610b. In this case, the page may be determined to be displayed based on the page being finally edited between the first page 1621 and the second page 1622.

Referring to FIG. 16B, the electronic device 101 may include the shape of the rollable electronic device 400. Referring to part (a) of FIG. 16B, as the unfolded state of the flexible display, the display 430 may include a large-screen area including all of the first area 430a and the second area 430b. In this case, the electronic device 101 may display all of a first page 1621 and a second page 1622 in an editing area 1610a based on the display state. Referring to part (b) of FIG. 16B, the display 430 is in a state where the flexible display is rolled up, and only the first area 430*a* is activated, and the second area 430*b* may be in a deactivated state. In this case, the electronic device 101 may reduce the editing area 1610*b* based on the display state, and may display only any one 1620*b* of the first page 1621 or the second page 1622 corresponding to the size of the reduced editing area 1610*b*. In this case, the page may be determined to be displayed based on the page being finally edited between the first page 1621 and the second page 1622.

Referring to FIG. 16C, the electronic device 101 may be connected to an external display 1601. Referring to part (a) of FIG. 16C, the external display 1601 may include a large-screen area, and may display the screen of the electronic device 101 based on the signal received from the electronic device. In this case, the electronic device 101 may display all the first page 1621, the second page 1622, and the third page 1623 in the editing area 1610*a* based on the display state. For example, the electronic device 101 may display the increased number of pages based on the aspect ratio of the connected external display 1601. Referring to part (b) of FIG. 16C, the electronic device 101 may be in a state where the connection 1602 with the external display 1601 is blocked (1603). In this case, the electronic device 101 may reduce the editing area 1610*b* based on the display state, and may display only any one 1620*b* among the first page 1621, the second page 1622, or the third page 1623 corresponding to the size of the reduced editing area 1610*b*. In this case, the page may be determined to be displayed based on the page being finally edited among the first page 1621, the second page 1622, or the third page 1623.

Figure 17:
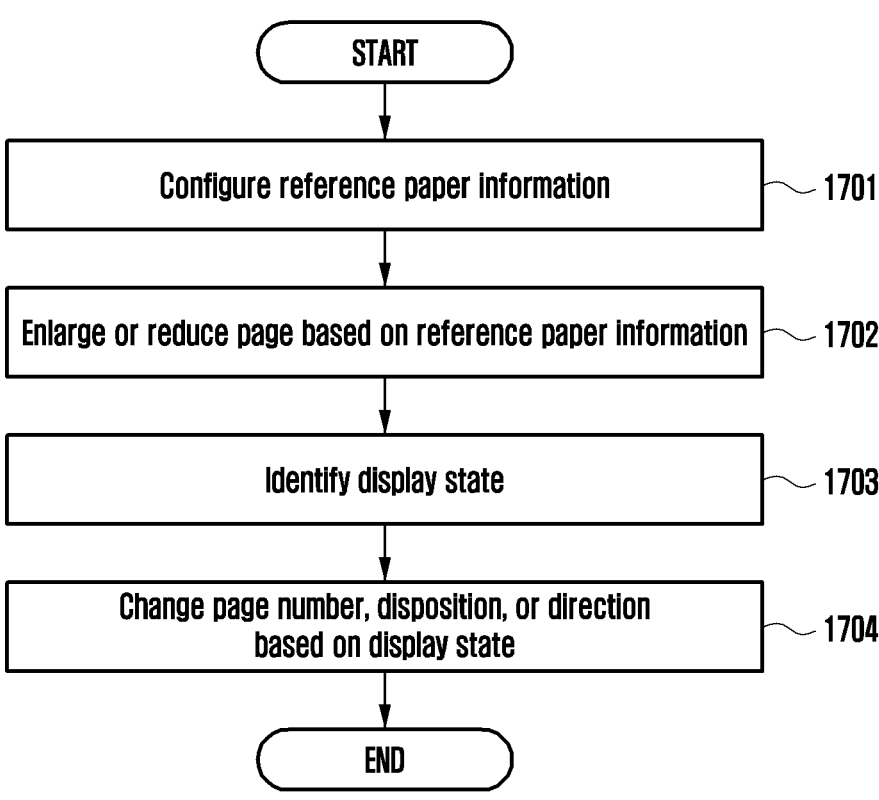
FIG. 17 is a flowchart illustrating an operation in which an electronic device changes pages being displayed based on the state of a display displaying content according to an embodiment of the disclosure.

FIG. 17 is a flowchart illustrating an operation in which an electronic device changes pages being displayed based on the state of a display displaying content according to an embodiment of the disclosure.

Referring to FIG. 17, a series of operations in which the electronic device (e.g., electronic device 101 of FIG. 1 or electronic device 101 of FIG. 5) changes pages being displayed based on the state of the display displaying content may be explained as operations being performed by the processor (e.g., processor 120 of FIG. 1 or processor 120 of FIG. 5) of the electronic device. Parts of the operations of FIG. 17 may be changed or replaced by replaceable operations, or the order thereof may be changed.

In operation 1701, the processor 120 may configure reference paper information. The reference paper information may be information becoming the basis of the arrangement, location, direction, and/or magnification of pages. The reference paper information may be determined based on any one page (e.g., first page) predetermined among the plurality of pages included in the content. For example, the reference paper information may include the size of the first page becoming the basis, direction (e.g., horizontal direction or vertical direction), scroll direction, and/or aspect ratio.

In operation 1702, the processor 120 may enlarge, reduce, and/or rotate the remaining page (e.g., second page) excluding the first page based on the reference paper information. For example, in case that the scroll direction is configured as the vertical direction, the processor 120 may enlarge or reduce all other pages so that the pages are displayed with the same horizontal length as the first page becoming the reference paper based on the reference paper information. In this case, the processor 120 may display the page (e.g., second page) being enlarged or reduced as much as the magnification so that the second page has the same horizontal length as the first page, and the object included in the page may also be displayed in an enlarged or reduced state based on the same magnification.

In operation 1703, the processor may identify the display state of the electronic device 101. The electronic device 101 may have various shapes, for example, the shape of the foldable electronic device, such as the electronic device 200 of FIG. 2 or the electronic device 300 of FIG. 3 and the plurality of display panels 210 and 250, or may have the shape of the rollable electronic device, such as the electronic device 400 of FIG. 4. In this case, based on the shape of the housing of the electronic device, the shape of the flexible display may be transformed, and the areas being activated among the display areas or the displays being activated among the plurality of displays may differ from each other.

In operation 1704, the processor 120 may identify the state of the display, and may change the number of pages to be displayed in the editing area, the disposition of each page, or the direction of the page based on the size and/or the aspect ratio of the activated area on the display.

An electronic device according to various embodiments of the disclosure may include: a display module including at least one display panel; a memory; and a processor operatively connected to the display module and the memory, wherein the memory, when executed, includes instructions causing the processor to: generate content including one or more pages and at least one object being displayed on the one or more pages based on a user input, display an editing area for editing the content by using the display module, and simultaneously apply the at least one object being generated or changed based on the user input to at least one partial area of a first page and at least one partial area of a second page corresponding to the editing area in case that the at least partial areas of the first page and the second page among the one or more pages are simultaneously displayed in the editing area.

The instructions may include instructions for separating the first object into one or more minimum units corresponding to an object type of the first object in case that the first object among the objects is located over the at least one partial area of the first page and the at least one partial area of the second page, and each of the separated minimum units may be included on the page corresponding to each of the minimum units.

The object type may include at least parts of a handwriting object, a text, a table, voice data, and an image, and the minimum unit may include a single stroke in case that the object type is the handwriting object, the minimum unit includes a single text in case that the object type is the text, the minimum unit includes a single cell in case that the object type is the table, and the minimum unit includes a single image in case that the object type is the image.

The instructions may include instructions for determining the page corresponding to each of the separated minimum units based on a distance from the first page and a distance from the second page with respect to each of the separated minimum units.

The instructions may include instructions for displaying a selection area for selecting at least a part of an area corresponding to a handwriting object including one or more strokes in the editing area in case that at least one object included in the content includes the handwriting object, displaying a preview area for outputting a text object obtained by recognizing the handwriting object included in the selection area, and selecting a location for displaying the preview area based on a size and/or a location of the selection area.

The instructions may include instructions for displaying two or more GUIs for adjusting the size and/or the location of the selection area, and selecting the location for displaying the preview area based on locations of the two or more graphic user interfaces.

The instructions may include instructions for displaying the selection area over the first page and the second page in case that the area corresponding to the handwriting object is located over the first page and the second page.

The instructions may include instructions for: separating the handwriting object into one or more lines based on locations of the one or more strokes, and selecting at least a part of the handwriting object based on the plurality of separated lines.

The instructions may include instructions for arranging a location of the handwriting object based on the plurality of separated lines.

The instructions may include instructions for displaying a selection area for selecting at least a part of the editing area in the editing area, and displaying a zoom area for zooming in and displaying at least a partial area of the editing area corresponding to the selection area.

The instructions may include instructions for simultaneously zooming in and displaying the at least one partial area of the first page corresponding to the selection area and the at least one partial area of the second page in the zoom area in case that the selection area is located over the first page and the second page.

The instructions may include instructions for displaying the result of the user input in the selection area corresponding to the zoom area based on the user input received in the zoom area.

The instructions may include instructions for determining at least one of a size, an aspect ratio, and a location of the zoom area based on at least one of sizes and aspect ratios of the first page and the second page, and locations of the first page and the second page disposed in the editing area.

The instructions may include instructions for configuring reference paper information based on the first page among a plurality of pages in case that the content includes the plurality of pages at least including the first page and the second page, and zooming in/out and displaying the remaining page excluding the first page among the plurality of pages based on the reference paper information.

The reference paper information may include at least parts of a paper specification, an aspect ratio, a horizontal length, a vertical length, and a paper direction of the first page, and scroll directions of the plurality of pages.

The instructions may include instructions for changing a size of at least one of the first page and the second page based on an aspect ratio of the at least one display panel.

The display module may include a plurality of display panels at least including a first display panel and a second display panel, the processor may be configured to deactivate the second display panel in case that the first display panel is activated and to deactivate the first display panel in case that the second display panel is activated, and the instructions may include instructions for changing at least parts of sizes of at least parts of the plurality of pages, the number of pages capable of being simultaneously displayed on the editing area, and display magnifications of at least parts of the plurality of pages based on size information of the activated panel between the first display panel and the second display panel.

The display module may include a flexible display panel having a variable shape, the processor may be configured to change a screen display area of the display module based on the shape of the flexible display panel, and the instructions may include instructions for changing at least parts of sizes of at least parts of the plurality of pages, the number of pages capable of being simultaneously displayed on the editing area, and display magnifications of at least parts the plurality of pages based on the screen display area.

A method by an electronic device for editing content according to various embodiments of the disclosure may include: generating content including one or more pages and at least one object being displayed on the one or more pages based on a user input; displaying an editing area for editing the content to an outside; and simultaneously applying the at least one object being generated or changed based on the user input to at least one partial area of a first page and at least one partial area of a second page corresponding to the editing area in case that the at least partial areas of the first page and the second page among the one or more pages are simultaneously displayed in the editing area.

The electronic device may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

a display including at least one display panel;

memory storing instructions; and at least one processor operatively connected to the display and the memory, wherein the instructions, when executed by the at least one processor individually or collectively, cause the electronic device to:

receive a user input to generate or change at least one object in content, included in one or more pages, being at least partially displayed in an editing area for editing the content, determine that the editing area includes at least partial areas respectively of a plurality of pages among the one or more pages, and simultaneously apply the at least one object, which is generated or changed based on the user input, to at least some of the at least partial areas respectively of the plurality of pages, based on it being determined that the editing area includes the at least partial areas respectively of the plurality of pages, wherein for at least a part of the at least one object disposed across horizontally adjacent portions of at least two of the at least partial areas respectively of the plurality of pages, the at least the part of the least one object is simultaneously applied to the horizontally adjacent portions of the at least two of the at least partial areas respectively of the plurality of pages, and wherein for at least a portion of the at least one object disposed across vertically adjacent portions of two or more of the at least partial areas respectively of the plurality of pages, the at least the portion of the least one object is simultaneously applied to the vertically adjacent portions of the two or more of the at least partial areas respectively of the plurality of pages.

2. The electronic device of claim 1, wherein the instructions, when executed by the at least one processor individually or collectively, further cause the electronic device to:

separate a first object of the at least one object into one or more minimum units corresponding to an object type of the first object, in case that the first object is disposed across adjacent portions of more than one of the at least partial areas respectively of the plurality of pages, and wherein each of the one or more minimum units is included on an at least partial area of a page corresponding thereto.

3. The electronic device of claim 2, wherein the object type is at least one of a handwriting object type, a text object type, a table object type, voice data object type, or an image object type, wherein a first minimum unit of the one or more minimum units includes a single stroke in case that the object type is the handwriting object type, wherein a second minimum unit of the one or more minimum units includes a single text in case that the object type is the text object type, wherein a third minimum unit of the one or more minimum units includes a single cell in case that the object type is the table object type, and wherein a fourth minimum unit of the one or more minimum units includes a single image in case that the object type is the image object type.

4. The electronic device of claim 2, wherein the instructions, when executed by the at least one processor individually or collectively, further cause the electronic device to:

determine the page corresponding to each of the one or more minimum units based on a distance from each of at least two closest pages with respect to each of the one or more minimum units.

5. The electronic device of claim 1, wherein the instructions, when executed by the at least one processor individually or collectively, further cause the electronic device to:

display a selection area for selecting at least a part of an area corresponding to a handwriting object including one or more strokes in the editing area, in case that the at least one object includes the handwriting object, display a preview area for outputting a text object obtained by recognizing the handwriting object in the selection area, and select a location for displaying the preview area based on at least one of a size or a location of the selection area.

6. The electronic device of claim 5, wherein the instructions, when executed by the at least one processor individually or collectively, further cause the electronic device to:

display two or more graphical user interfaces (GUIs) for adjusting the at least one of the size or the location of the selection area, and select the location for displaying the preview area based on locations of the two or more GUIs.

7. The electronic device of claim 5, wherein the instructions, when executed by the at least one processor individually or collectively, further cause the electronic device to:

display the selection area over at least partial areas respectively of adjacent pages among the plurality of pages, in case that the area corresponding to the handwriting object is located over the at least partial areas respectively of the adjacent pages.

8. The electronic device of claim 5, wherein the instructions, when executed by the at least one processor individually or collectively, further cause the electronic device to:

divide the handwriting object into one or more lines based on locations of the one or more strokes, and select at least a part of the handwriting object based on the one or more lines.

9. The electronic device of claim 8, wherein the instructions, when executed by the at least one processor individually or collectively, further cause the electronic device to:

arrange a location of the handwriting object based on the one or more lines.

10. The electronic device of claim 1, wherein the instructions, when executed by the at least one processor individually or collectively, further cause the electronic device to:

display a selection area for selecting at least a part of the editing area in the editing area, and display a zoom area for zooming in and displaying at least a partial area of the editing area corresponding to the selection area.

11. The electronic device of claim 10, wherein the instructions, when executed by the at least one processor individually or collectively, further cause the electronic device to:

simultaneously zoom in and display the zoom area including at least a part of the at least partial areas respectively of the plurality of pages corresponding to the selection area, in case that the selection area is located over page the at least the part of the at least partial areas respectively of the plurality of pages.

12. The electronic device of claim 10, wherein the instructions, when executed by the at least one processor individually or collectively, further cause the electronic device to:

display a result of the user input in the selection area corresponding to the zoom area, based on the user input received in the zoom area.

13. The electronic device of claim 10, wherein the instructions, when executed by the at least one processor individually or collectively, further cause the electronic device to:

determine at least one of a size, an aspect ratio, or a location of the zoom area, based on at least one of sizes, aspect ratios, or locations of the plurality of pages disposed in the editing area.

14. The electronic device of claim 1, wherein the instructions, when executed by the at least one processor individually or collectively, further cause the electronic device to:

configure reference paper information based on a first page, in case that the content is included in at least the first page and a second page among the plurality of pages, and at least one of zoom in or out, and display at least one remaining page excluding the first page among the plurality of pages, based on the reference paper information.

15. The electronic device of claim 14, wherein the reference paper information comprises at least one of a paper specification of the first page, an aspect ratio of the first page, a horizontal length of the first page, a vertical length of the first page, a paper direction of the first page, or scroll directions of the one or more pages.

16. The electronic device of claim 1, wherein the instructions, when executed by the at least one processor individually or collectively, further cause the electronic device to:

change a size of at least one of the plurality of pages based on an aspect ratio of the at least one display panel.

17. The electronic device of claim 1, wherein the display comprises a plurality of display panels including at least a first display panel and a second display panel, and wherein the instructions, when executed by the at least one processor individually or collectively, further cause the electronic device to;

deactivate the second display panel, in case that the first display panel is activated, deactivate the first display panel, in case that the second display panel is activated, and change at least one of a size of at least one of the one or more pages, a number of the one or more pages capable of being simultaneously displayed in the editing area, or display magnifications of the at least one of the one or more pages, based on size information of one of the first display panel or the second display panel that is activated.

18. The electronic device of claim 1, wherein the display comprises a flexible display panel having a shape that is variable, and wherein the instructions, when executed by the at least one processor individually or collectively, further cause the electronic device to:

change a screen display area of the display, based on the shape of the flexible display panel, and change at least one of a size of at least one of the one or more pages, a number of the one or more pages capable of being simultaneously displayed in the editing area, or display magnifications of the at least one of the one or more pages, based on the screen display area.

19. A method performed by an electronic device, the method comprising:

receiving a user input to generate or change at least one object in content, included in one or more pages, being at least partially displayed in an editing area for editing the content;

determining that the editing area includes at least partial areas respectively of a plurality of pages among the one or more pages; and simultaneously applying the at least one object, which is generated or changed based on the user input, to at least some of the at least partial areas respectively of the plurality of pages, based on it being determined that the editing area includes the at least partial areas respectively of the plurality of pages, wherein for at least a part of the at least one object disposed across horizontally adjacent portions of at least two of the at least partial areas respectively of the plurality of pages, the at least the part of the least one object is simultaneously applied to the horizontally adjacent portions of the at least two of the at least partial areas respectively of the plurality of pages, and wherein for at least a portion of the at least one object disposed across vertically adjacent portions of two or more of the at least partial areas respectively of the plurality of pages, the at least the portion of the least one object is simultaneously applied to the vertically adjacent portions of the two or more of the at least partial areas respectively of the plurality of pages.

20. The method of claim 19, wherein the content, included in the one or more pages, being at least partially displayed in the editing area, is displayed on a display of an external device connected to the electronic device.

* * * * *